(12) United States Patent
Yamaguchi et al.

(10) Patent No.: US 8,352,596 B2
(45) Date of Patent: Jan. 8, 2013

(54) METHOD, APPARATUS, AND COMPUTER PROGRAM FOR PROCESSING INFORMATION

(75) Inventors: Hiroshi Yamaguchi, Tokyo (JP); Toru Konishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/332,012

(22) Filed: Dec. 20, 2011

(65) Prior Publication Data

US 2012/0096152 A1 Apr. 19, 2012

Related U.S. Application Data

(63) Continuation of application No. 10/654,418, filed on Sep. 5, 2003, now Pat. No. 8,095,664.

(30) Foreign Application Priority Data

Sep. 6, 2002 (JP) ................................. 2002-260806

(51) Int. Cl.
*G06F 15/173* (2006.01)
(52) U.S. Cl. ......... 709/224; 709/223; 709/225; 709/226
(58) Field of Classification Search .......... 709/223–226
See application file for complete search history.

(56) References Cited

U.S. PATENT DOCUMENTS

| | | |
|---|---|---|
| 5,649,100 A | 7/1997 | Ertel et al. |
| 5,892,912 A | 4/1999 | Suzuki et al. |
| 5,950,195 A | 9/1999 | Stockwell et al. |
| 5,983,270 A | 11/1999 | Abraham et al. |
| 6,028,984 A | 2/2000 | Kimball |
| 6,052,736 A | 4/2000 | Ogle et al. |
| 6,175,867 B1 | 1/2001 | Taghadoss |
| 6,243,758 B1 | 6/2001 | Okanoue |
| 6,321,272 B1 | 11/2001 | Swales |
| 6,370,653 B1 | 4/2002 | Ichinohe et al. |
| 6,412,007 B1 | 6/2002 | Bui et al. |
| 6,553,498 B1 | 4/2003 | Elgressy et al. |
| 6,581,108 B1 | 6/2003 | Denison et al. |
| 6,594,704 B1 | 7/2003 | Birenback et al. |
| 6,671,273 B1 | 12/2003 | Beck |
| 6,678,827 B1 | 1/2004 | Rothermel et al. |
| 6,738,908 B1 | 5/2004 | Bonn et al. |
| 6,772,204 B1 | 8/2004 | Hansen |
| 6,922,728 B2 | 7/2005 | Cho |
| 6,957,274 B2 | 10/2005 | Trace et al. |
| 6,996,631 B1 | 2/2006 | Aiken et al. |
| 7,007,078 B2 | 2/2006 | Matsuda |
| 7,032,024 B1 | 4/2006 | Park |

(Continued)

FOREIGN PATENT DOCUMENTS

JP 7-504314 5/1995

(Continued)

*Primary Examiner* — Brian P Whipple
(74) *Attorney, Agent, or Firm* — Oblon, Spivak, McClelland, Maier & Neustadt, L.L.P.

(57) ABSTRACT

A switcher, residing in a memory, detects a connectable network when a terminal is powered on. When a network is detected, a communication unit issues a message to a processor. The processor detects whether the terminal has ever been connected to the detected network and whether the profile of the network is registered. If the processor determines that the profile of the network is registered, a connection to the network is established in accordance with the profile. If the processor determines that no profile of the network is registered, a new profile of the network is produced, and then registered. The present invention is applicable to personal computers.

13 Claims, 30 Drawing Sheets

U.S. PATENT DOCUMENTS

| | | |
|---|---|---|
| 7,131,141 B1 | 10/2006 | Blewett et al. |
| 7,155,518 B2 | 12/2006 | Fowslow |
| 7,187,658 B2 | 3/2007 | Koyanagi et al. |
| 7,325,246 B1 | 1/2008 | Halasz et al. |
| 2001/0013067 A1 | 8/2001 | Koyanagi et al. |
| 2001/0042213 A1 | 11/2001 | Jemes et al. |
| 2002/0007407 A1 | 1/2002 | Klein |
| 2002/0133534 A1 | 9/2002 | Forslow |
| 2002/0161917 A1 | 10/2002 | Shapiro et al. |
| 2002/0187779 A1 | 12/2002 | Freeny |
| 2003/0070100 A1 | 4/2003 | Winkler |
| 2003/0217124 A1 | 11/2003 | Parry |
| 2003/0220977 A1 * | 11/2003 | Malik .......................... 709/206 |
| 2003/0236875 A1 | 12/2003 | Green et al. |
| 2004/0030746 A1 | 2/2004 | Kavacheri et al. |

FOREIGN PATENT DOCUMENTS

| | | |
|---|---|---|
| JP | 11-234307 | 8/1999 |
| JP | 2001-142814 | 5/2001 |
| JP | 2001-230803 | 8/2001 |
| JP | 2002-152407 | 5/2002 |
| WO | WO 94/18782 | 8/1994 |

* cited by examiner

FIG. 11

ROUTING TABLE

| | Network Destination | Netmask | Gatway | Interface | Metric |
|---|---|---|---|---|---|
| Active Routes: | | | | | |
| 1 | 0.0.0.0 | 0.0.0.0 | 12.34.xx.xx.98.254 | 12.34.xx.xx.98.8 | 20 |
| 2 | 0.0.0.0 | 0.0.0.0 | 12.34.xx.xx.132.254 | 12.34.xx.xx.134.162 | 30 |
| 3 | 12.34.xx.xx.98.0 | 255.255.255.0 | 12.34.xx.xx.98.8 | 12.34.xx.xx.98.8 | 20 |
| 4 | 12.34.xx.xx.98.8 | 255.255.255.255 | 127.0.0.1 | 127.0.0.1 | 20 |
| 5 | 12.34.xx.xx.132.0 | 255.255.252.0 | 12.34.xx.xx.34.162 | 12.34.xx.xx.134.162 | 30 |
| 6 | 12.34.xx.xx.134.162 | 255.255.255.255 | 127.0.0.1 | 127.0.0.1 | 30 |
| 7 | 12.34.xx.xx.255.255 | 255.255.255.255 | 12.34.xx.xx.98.8 | 12.34.xx.xx.98.8 | 20 |
| 8 | 12.34.xx.xx.255.255 | 255.255.255.255 | 12.34.xx.xx.134.162 | 12.34.xx.xx.134.162 | 30 |
| 9 | 127.0.0.0 | 255.0.0.0 | 127.0.0.1 | 127.0.0.1 | 1 |
| 10 | 224.0.0.0 | 240.0.0.0 | 12.34.xx.xx.98.8 | 12.34.xx.xx.98.8 | 20 |
| 11 | 224.0.0.0 | 240.0.0.0 | 12.34.xx.xx.134.162 | 12.34.xx.xx.134.162 | 30 |
| 12 | 255.255.255.255 | 255.255.255.255 | 12.34.xx.xx.98.8 | 12.34.xx.xx.98.8 | 1 |
| 13 | 255.255.255.255 | 255.255.255.255 | 12.34.xx.xx.134.162 | 12.34.xx.xx.134.162 | 1 |
| 14 | Default Gatway: | 12.34.xx.xx.98.254 | | | |

FIG. 14

```
<?xml version="1.0" encoding="UTF-8" ?>
<beswitcher>
<profile_list>
<profile version="1.00">                                            ─ 101
   <profileInfo>                                                    ─ 102
      <profileName>NTT com hotspot</profileName>
      <place>wireless LAN access service</place>
      <method>wireless LAN</method>
      <description>auto login to hotspot of NTT com acceptable</description>
      <confirmBefore>1</confirmBefore>
      <confirmAutoClose>1</confirmAutoClose>
      <notifyAfter>1</notifyAfter>
      <notifyAutoClose>1</notifyAutoClose>
      <enable>1</enable>
   </profileInfo>
   <postProcess>                                                    ─ 103
      <entry>
         <path>C:\Program Files\Sony\Smart Network\bin\hslogin.exe</path>
         <option />
         <workDir />
         <programName />
         <waitProcEnd>1</waitProcEnd>
      </entry>
      <entry>
         <path>C:\Program Files\Sony\Smart Network\bin\BeSound.exe</path>
         <option>1200 1200 C:\WINDOWS\Media\notify.wav</option>
         <workDir>C:\Program Files¥Sony\Smart Network</workDir>
         <programName />
         <waitProcEnd>1</waitProcEnd>
      </entry>
      <enable>1</enable>
   </postProcess>                                                   ─ 104
```

PROFILE A ─ 53

FIG. 15

PROFILE A — 53

105

```
<networkInfo>
  <ifName>Wireless LAN interface</ifName>
  <ssid>1234</ssid>
  <idPcName />
  <mac>00-00-00-00-00-00</mac>
  <ip>0.0.0.0</ip>
  <ifType>3</ifType>
  <enable>1</enable>
  <selectPriority>1</selectPriority>
</networkInfo>
```

106

```
<IOproxy>
  <serverHttp />
  <serverFtp />
  <serverSecure />
  <serverGopher />
  <serverSocks />
  <bypassServers />
  <serverAutoConfig />
  <autoDiscovery>0</autoDiscovery>
  <autoConfig>0</autoConfig>
  <useProxy>0</useProxy>
  <sameName>0</sameName>
  <bypassLocal>0</bypassLocal>
  <enable>1</enable>
  <portHttp>-1</portHttp>
  <portFtp>-1</portFtp>
  <portSecure>-1</portSecure>
  <portGopher>-1</portGopher>
  <portSocks>-1</portSocks>
</IOproxy>
```

FIG. 18

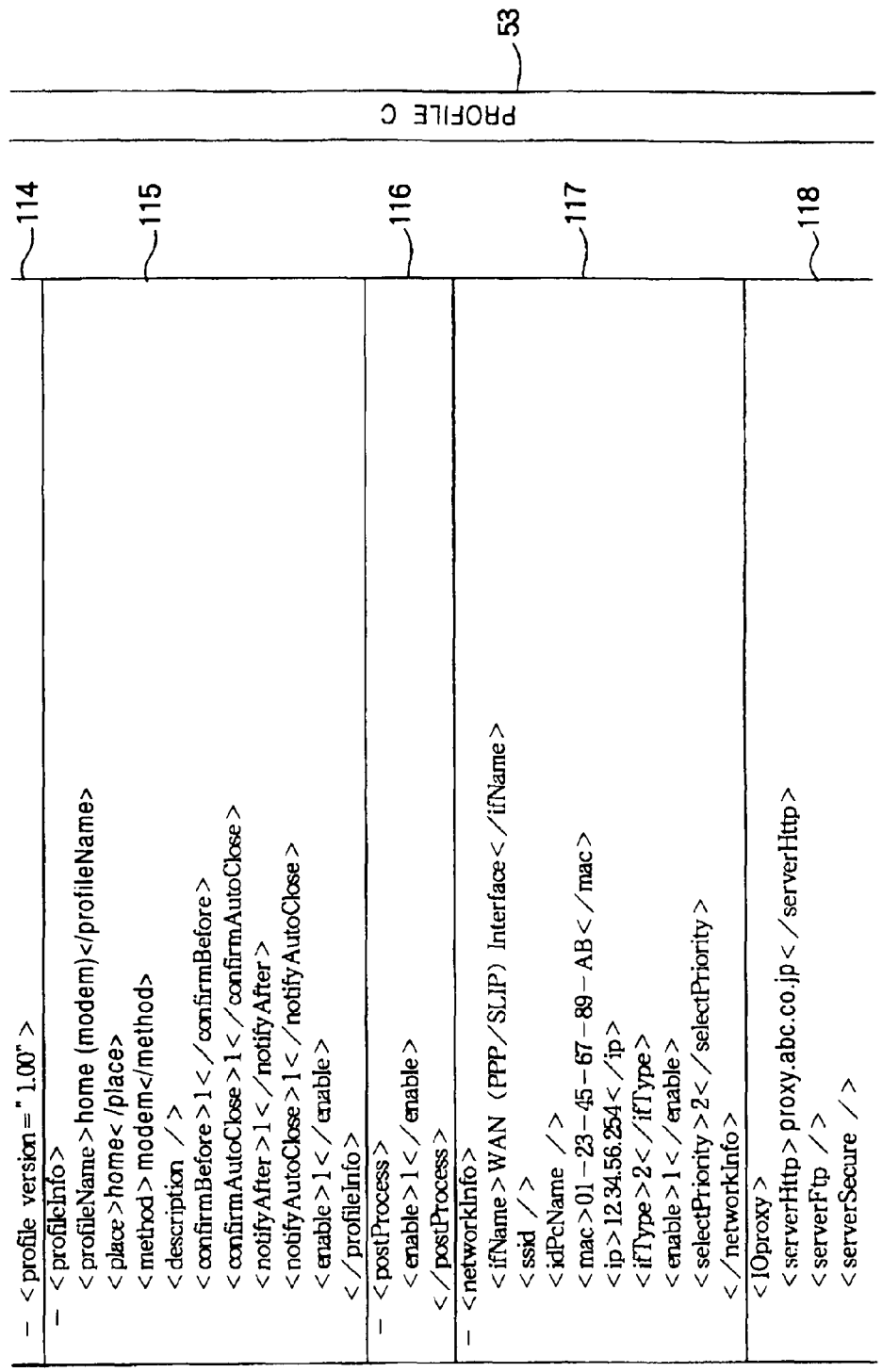

```
- <profile version="1.00">
  - <profileInfo>
    <profileName>home (modem)</profileName>
    <place>home</place>
    <method>modem</method>
    <description />
    <confirmBefore>1</confirmBefore>
    <confirmAutoClose>1</confirmAutoClose>
    <notifyAfter>1</notifyAfter>
    <notifyAutoClose>1</notifyAutoClose>
    <enable>1</enable>
  </profileInfo>
  - <postProcess>
    <enable>1</enable>
  </postProcess>
  - <networkInfo>
    <ifName>WAN (PPP/SLIP) Interface</ifName>
    <ssid />
    <idPcName />
    <mac>01-23-45-67-89-AB</mac>
    <ip>12.34.56.254</ip>
    <ifType>2</ifType>
    <enable>1</enable>
    <selectPriority>2</selectPriority>
  </networkInfo>
  - <IOproxy>
    <serverHttp>proxy.abc.co.jp</serverHttp>
    <serverFtp />
    <serverSecure />
```

PROFILE C — 53

114, 115, 116, 117, 118

METHOD, APPARATUS, AND COMPUTER PROGRAM FOR PROCESSING INFORMATION

CROSS-REFERENCE TO RELATED APPLICATIONS

This application is a continuation of U.S. application Ser. No. 10/654,418 filed Sep. 5, 2003, and is based upon and claims the benefit of priority from the prior Japanese Patent Application No. 2002-260806, filed on Sep. 6, 2002, the entire contents of each of which are hereby incorporated herein by reference.

BACKGROUND OF THE INVENTION

1. Field of the Invention

The present invention relates to a method, an apparatus, and a computer program for processing information and, particularly, to a method, an apparatus, and a computer program for appropriate use in an apparatus connected to a plurality of networks.

2. Description of the Related Art

Computers having a size appropriate for portable use are now finding widespread use. Such computers are called mobile computers. Connections to the Internet are conventionally performed using wire. As wireless local area networks (LAN) are in widespread use, both wired connection to networks and wireless connection to networks become used.

Wireless LANs are installed anywhere in urban areas, for example, in fastfood stores to provide hotspot service, in which people enjoys wireless LAN connections. For example, a user, who uses a mobile computer, may establish a link to a network through a wireless LAN at home, may establish a link to the network through a wired LAN in a company office, and then may establish a link to the network through a wireless LAN available in the hotspot service.

The mobile computer, which is easily connected to different networks under different environments, must have the settings different from network to network. Depending on location, the user sets an appropriate connection destination, and needs to switch connection destinations of network. Since the setting and switching operations are inconvenient, a technique of using a simple operation to switch the networks has been proposed, for example, as disclosed in Japanese Unexamined Patent Application Publication No. 2000-311080 and Internet support software "Internet Kaisokubin Ver. 2.1" supplied by SHARP CORPORATION.

The same mobile computer is typically used under a plurality of network environments. The user must manually switch the network connection setting thereof (hereinafter also referred to as a profile). To switch the network connection setting, the user must recognize and memorize each profile.

Networks based on wireless technology such as wireless LAN and Bluetooth are now in widespread use. Under an environment, a connection to the network based on the wireless technology may be automatically established without user intervention. In other words, the user's terminal is connected to a network without the user being aware of connection if the user enters an area of a wireless network. The user has difficulty in manually setting a connection to a desired network.

The wireless networks and the wired networks currently coexist, and a plurality of access points to a plurality of networks may be close to each other. Under such a situation, the user has difficulty in recognizing whether a plurality of connections are established, what network the user's terminal is currently connected to, and what network is currently used for communication.

The cited references suffers from this drawback.

SUMMARY OF THE INVENTION

Accordingly, it is an object of the present invention to a method, an apparatus, and a computer program for switching from network to network without any manual operation by the user.

The present invention in one aspect relates to an information processing apparatus having an interface for connection with networks and includes a managing unit for managing settings for the networks as profiles on a network by network basis, a detecting unit for detecting a first connection to the network, a determination unit for determining whether the managing unit manages the profile corresponding to the detected network when the detecting unit has detected the first connection to the network, and an establishing unit for establishing a second connection to the network based on the managed profile if the determination unit determines that the managing unit manages the profile corresponding to the network.

The detecting unit may detect the first connection to the network by determining whether or not a routing table is modified.

The detecting unit may detect, as the first connection, a connection to a gateway that manages the network, the determination unit may determine whether the managing unit manages the profile relating to the gateway, and the establishing unit establishes the second connection to the network in accordance with the profile relating to the gateway.

Preferably, the information processing apparatus further includes a counter for counting up by one when the detecting unit detects the first connection to the network, and a zero determination unit that determines whether the subtracting of one from the count of the counter makes zero when the detecting unit detects the first connection to the network, wherein the zero determination unit determines whether the managing unit manages the profile relating to the network detected by the detecting unit when the zero determination unit determines that the subtracting of one from the count of the counter makes zero.

Using at least one of an SSID, an MAC address, an IP address, and a connection name the user provides the network with, the determination unit may determine whether the managing unit manages the profile, relating to the network detected by the detecting unit.

If the interface is one of a wired LAN interface and a wireless LAN interface, the first connection is a connection to a gateway that manages the network, and the second connection is a connection to another apparatus through the gateway, and if the interface is a modem, the first connection is a connection to an ISP, and the second connection is a connection to another apparatus through the ISP.

Preferably, the information processing apparatus further includes a starter unit which starts a predetermined software set by a user when the second connection to the network is established by the establishing unit.

The present invention in another aspect relates to an information processing method for an information processing apparatus having an interface for connection with networks, and includes a managing step for managing settings for the networks as profiles on a network by network basis, a detecting step for detecting a first connection to the network, a determination step for determining whether the profile corresponding to the detected network is managed in the managing step when the first connection to the network has been detected in the detecting step, and an establishing step for establishing a second connection to the network based on the managed profile if the determination step determines that the profile corresponding to the network is managed in the managing step.

The present invention in yet another aspect relates to a computer program for a computer for controlling an information processing apparatus having an interface for connection with networks, the computer program comprising computer executable codes for performing a managing step for managing settings for the networks as profiles on a network by network basis, a detecting step for detecting a first connection to the network, a determination step for determining whether the profile corresponding to the detected network is managed in the managing step when the first connection to the network has been detected in the detecting step, and an establishing step for establishing a second connection to the network based on the managed profile if the determination step determines that the profile corresponding to the network is managed in the managing step.

In accordance with the apparatus, the method, and the computer program of the present invention, it is determined whether a profile of a network is present among profiles produced beforehand when a network connection is detected. If the profile of the network is found, the connection to the network is established in accordance with the profile.

BRIEF DESCRIPTION OF THE DRAWINGS

FIG. 11 is a routing table;

FIG. 14 specifically illustrates a profile;

FIG. 15 specifically illustrates the profile;

FIG. 18 specifically illustrates the profile;

DESCRIPTION OF THE PREFERRED EMBODIMENTS

Figure 1:
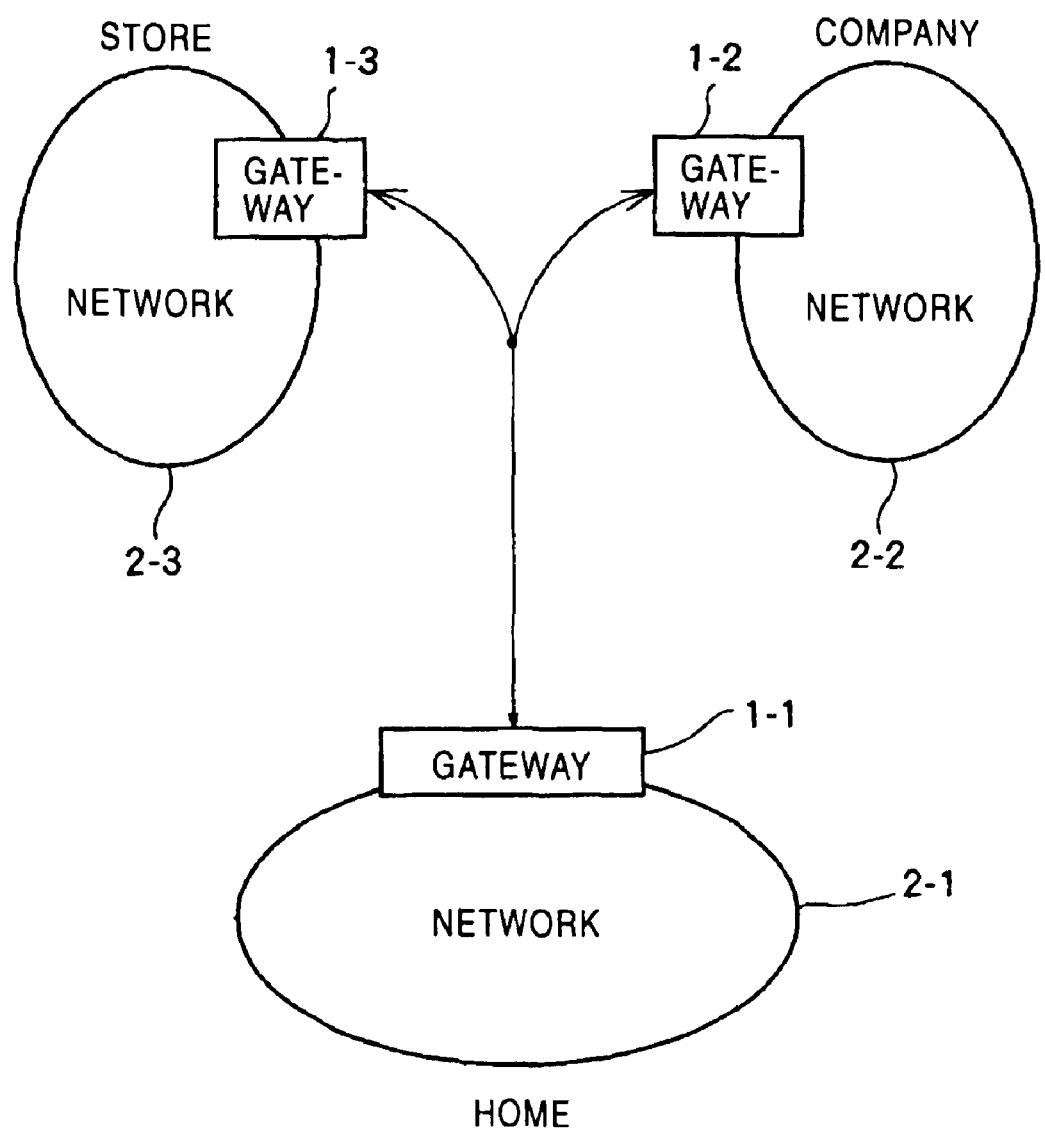
FIG. 1 illustrates a network that implements the present invention.

The embodiments of the present invention are discussed with reference to the drawings. FIG. 1 illustrates a communication environment in which a terminal 10 (see FIG. 2) is used as an information processing apparatus implementing the present invention. The portable terminal 10 used by the user is referred to as a mobile computer. The user carries the terminal 10 for use at various locations such as home, a company office, and a store such as a fastfood store, and connects the terminal 10 to a network to perform a predetermined process.

A network 2-1 equipped with a gateway 1-1 is organized at home. Likewise, a network 2-2 equipped with a gateway 1-2 is organized in a company office, and a network 2-3 equipped with a gateway 1-3 is organized in a store. The networks 2-1 through 2-3 are mutually connected through the gateways 1-1 through 1-3. In the discussion that follows, each of the gateways 1-1 through 1-3 is simply represented by a gateway 1 if there is no need for discriminating between the gateways 1-1 through 1-3. The same is true of the numeric reference numbers of the remaining elements.

The gateway 1 connects a computer to a public telephone line or connects a LAN to the public telephone line when a plurality of computers (terminals) are interconnected to the LAN. The gateway 1 uses a mini-computer, and is also referred to as a gateway processor. A large-scale gateway is not required when a computer is connected to a terminal through the public telephone line. To perform a network-to-network communication, the gateway 1 must control communication rate, communication traffic, and convert addresses of the computer from network to network. The gateway 1 having a throughput of a mini-computer level is thus required.

A network 2 performs communications using a wired LAN, a wireless LAN, or a modem.

Figure 2:
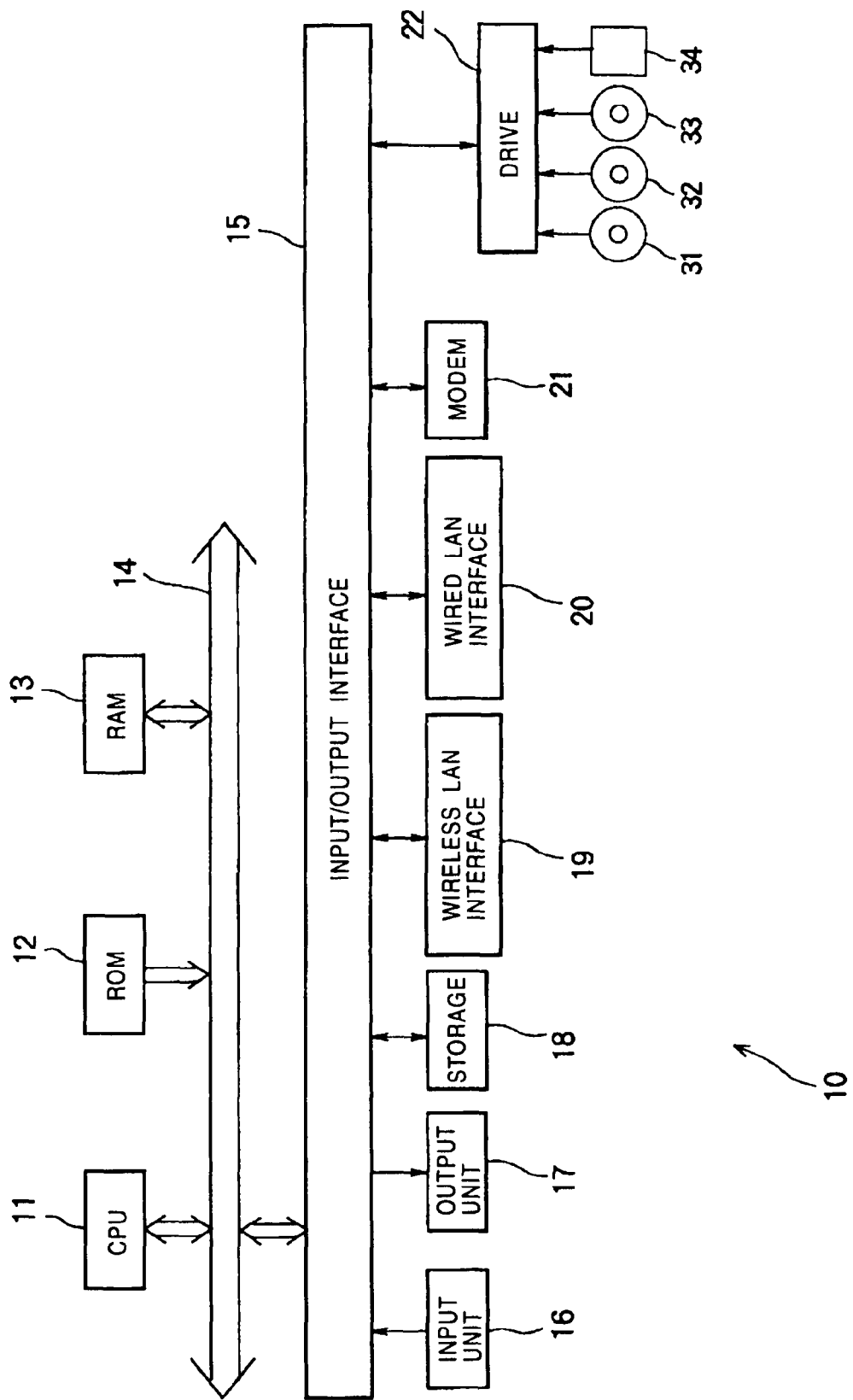
FIG. 2 is a block diagram illustrating the internal structure of a terminal.

FIG. 2 is a block diagram illustrating the internal structure of the terminal 10 carried by the user. A central processing unit (CPU) 11 of the terminal 10 performs various processes in accordance with a program stored in a read-only memory (ROM) 12. A random access memory (RAM) 13 stores data and programs which are required when the CPU 11 performs a variety of processes. An input unit 16 including a keyboard and a mouse is connected to an input/output interface 15, which transfers a signal input to the input unit 16 to the CPU 11. The input/output interface 15 is also connected to an output unit 17 including a display and a loudspeaker.

Also connected to the input/output interface 15 is a storage 18 including a hard disk. The input/output interface 15 is connected to each of a wireless LAN interface 19, a wired LAN interface 20, and a modem 21. Also connected to the input/output interface 15 is a drive 22 that is used to read data from and write data to a recording medium such as a magnetic disk 31, an optical disk 32, a magnetooptical disk 33, or a semiconductor memory 34. An operation performed by the terminal 10 will now be discussed. The terminal 10 performs a connection process to the network 2 shown in FIG. 1 without user intervention. By "automatically" used in the following discussion is meant that the process of the terminal 10 is performed without user intervention. The word "automatically" does not mean that the terminal 10 stands still with no action taken at all.

In the discussion that follows, a "connection" to a network is performed in two phase communications, namely, first phase communication and second phase communication. In the first phase communication, the terminal 10 exchanges data with the gateway 1 (or exchange data with a server of a Internet service provider (ISP) which is located beyond the gateway 1), and in the second phase communication, the terminal 10 freely exchanges data at will over a network subsequent to processes such as an authentication process.

In other words, for example, the first phase communication refers to a state in which the terminal 10 detects a service of a wireless LAN when the terminal 10 enters a radiowave coverage area of the service provided by the wireless LAN. The second phase connection refers to a state in which the terminal 10 uses the service after being permitted to use the service as a result of an authentication process.

A process of transitioning from the first phase connection to the second phase connection will now be discussed.

Figure 3:
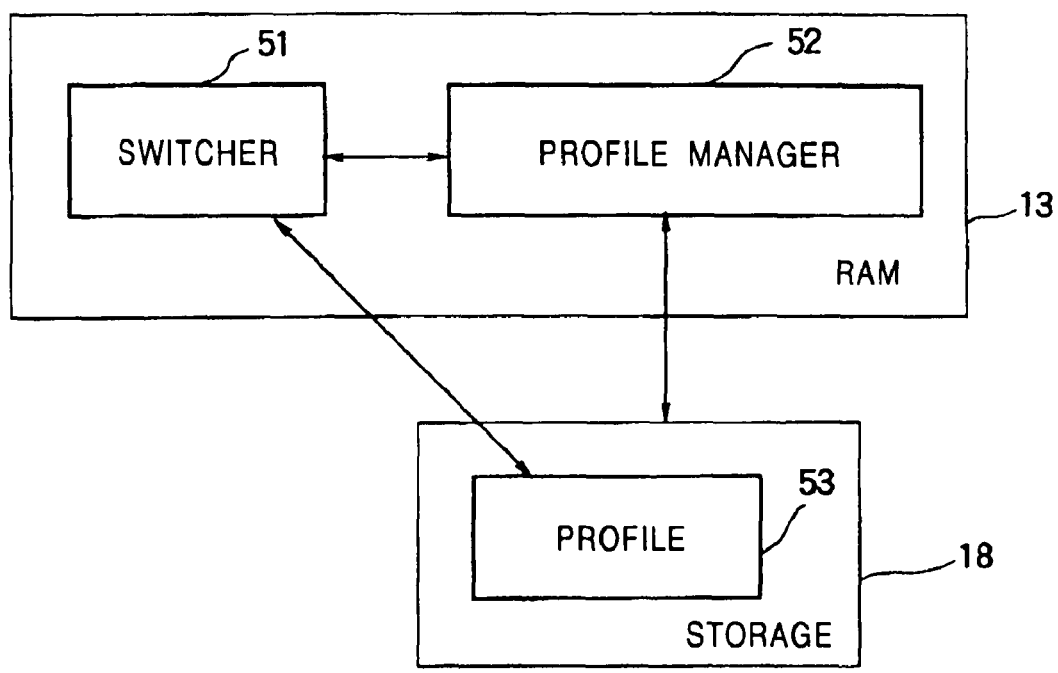
FIG. 3 illustrates a configuration of a started software.

The terminal 10 has a program to automatically switch the connection between different networks 2. That program is stored in the storage 18, and is expanded onto the RAM 13 as necessary. The CPU 11 performs a network connection switching process to the network 2 under the control of the program expanded in the RAM 13. FIG. 3 is a functional block diagram illustrating the function of the program expanded onto the RAM 13.

The program expanded in the RAM 13 includes a switcher 51 and a profile manager 52. The storage 18 stores a profile 53 that is produced by the profile manager 52 and read as necessary.

The switcher 51, residing in the terminal 10, detects a switching of the connected network 2. Upon detecting the switching of the connected network 2, the switcher 51 determines whether a profile 53 relating to a detected network 2 is present among profiles 53 stored in the storage 18.

In response to a command from the switcher 51, the profile manager 52 performs a network switching process in accordance with the profile 53, produces a profile 53 of a network if the network is new, and stores the produced profile 53 in the storage 18.

The switcher 51, residing in the terminal 10 throughout a power on period, starts up the profile manager 52 as necessary. The on state of the terminal 10 includes a suspension state of the terminal 10. The residence of the switcher 51 may be stopped by the user.

Figure 4:
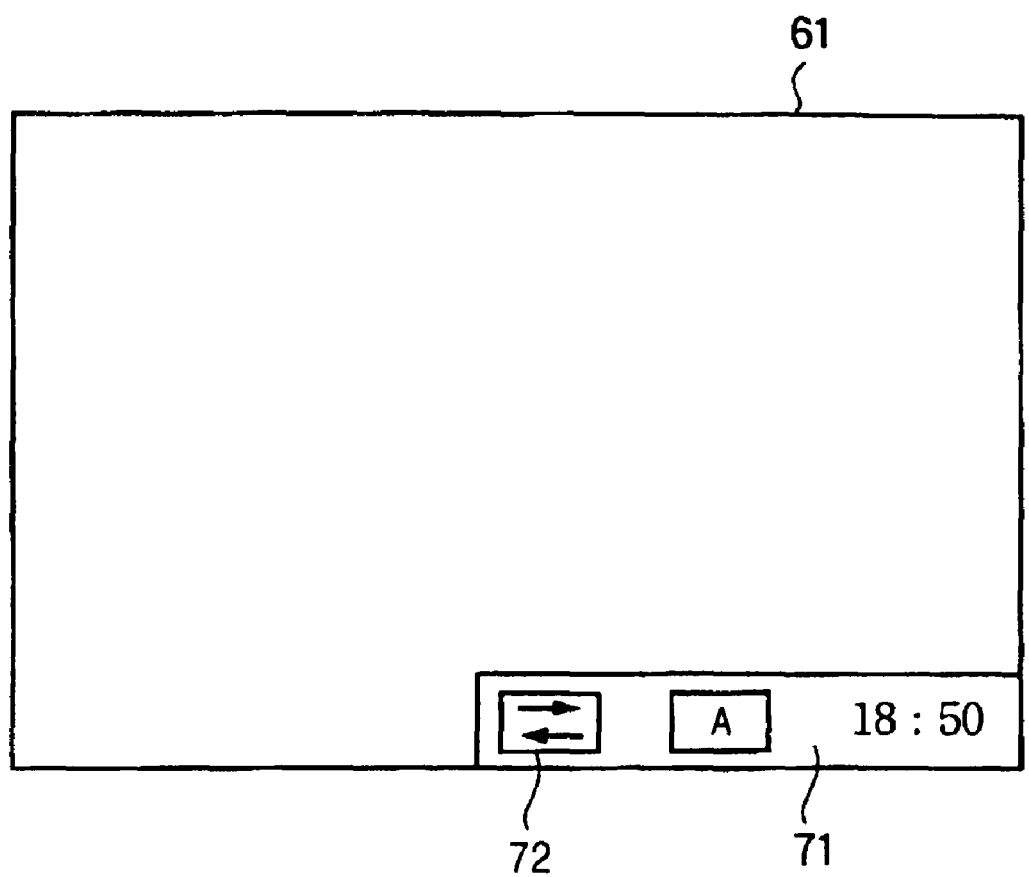
FIG. 4 illustrates the display of icons when a switcher resides.

While the switcher 51 resides in the terminal 10, an icon shown in FIG. 4 appears on a display 61 as an output unit 17. For example, a task tray 71 is presented on the bottom right of the display 61 when the terminal 10 is powered on. An icon relating to a then active software appears on the task tray 71. Since the switcher 51 is active as shown in FIG. 4, an icon 72 of the switcher 51 is also presented on the task tray 71.

Since the icon 72 of the switcher 51 is presented on the task tray 71, the user recognizes that the switcher 51 is active (resides). As will be discussed later, the setting of the switcher 51 and the profile manager 52 and the production of a new profile 53 may be performed by manipulating the icon 72.

Figure 5:
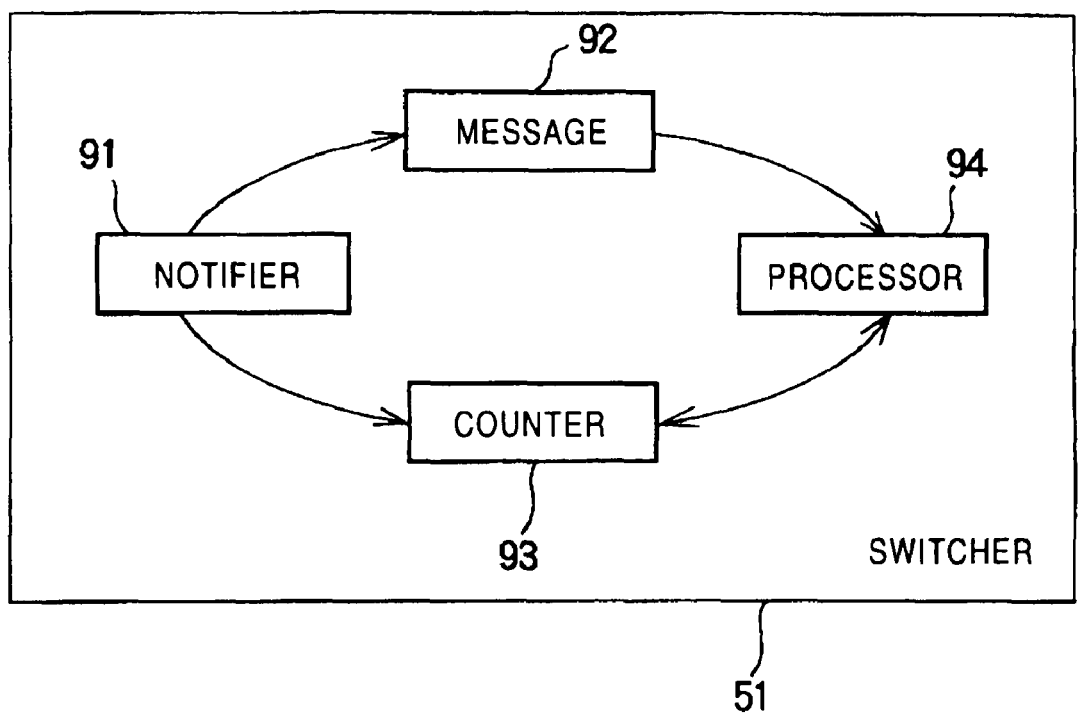
FIG. 5 illustrates the internal structure of the switcher.

An operation of the switcher 51 in the residing state thereof is discussed below. FIG. 5 illustrates in detail the internal structure of the switcher 51. The switcher 51 includes a notifier 91 that detects a new network 2 when the new network 2 is connected (when the network 2 as a connection destination is changed). Upon detecting the connection to the network 2, the notifier 91 notifies a processor 94 of the detection using a message 92. The notifier 91 also notifies a counter 93 of the connection to the network 2.

The counter 93 counts the number of connections to the networks 2. The processor 94 uses the resulting count to perform a process to be discussed later. When the connection to the network 2 is detected, the processor 94 determines whether or not to switch to the detected network 2. If the processor 94 determines that the connection should be switched to the detected network 2, the processor 94 instructs the profile manager 52 to switch to the network 2.

Figure 6:
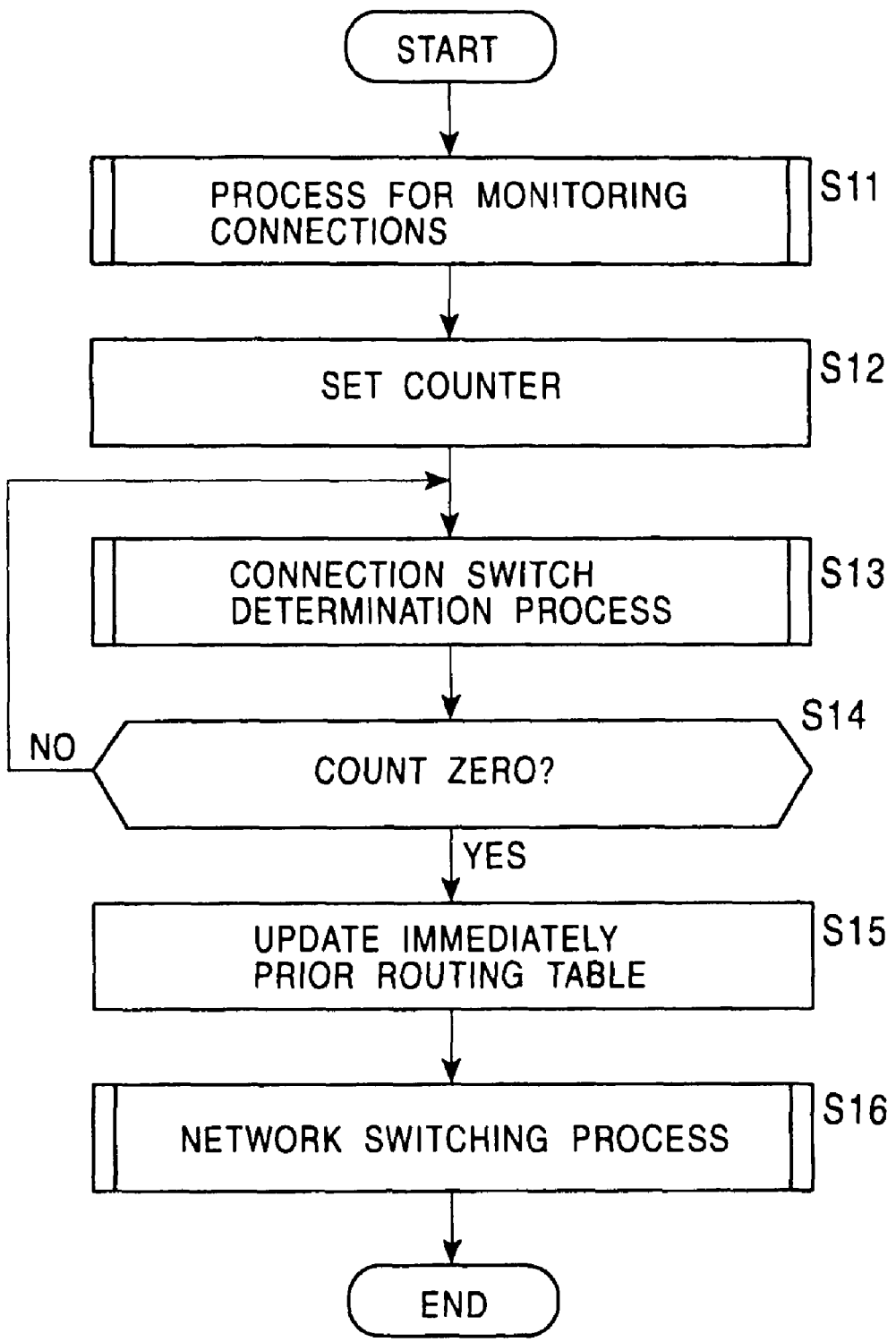
FIG. 6 is a flow diagram illustrating a process of the switcher.

FIG. 6 is a flow diagram illustrating a process of the switcher 51 having the structure illustrated in FIG. 5. In step S11, the switcher 51 starts monitoring connections. The monitoring process of the switcher 51 starts at the moment the switcher 51 starts residing in the terminal 10.

Figure 7:
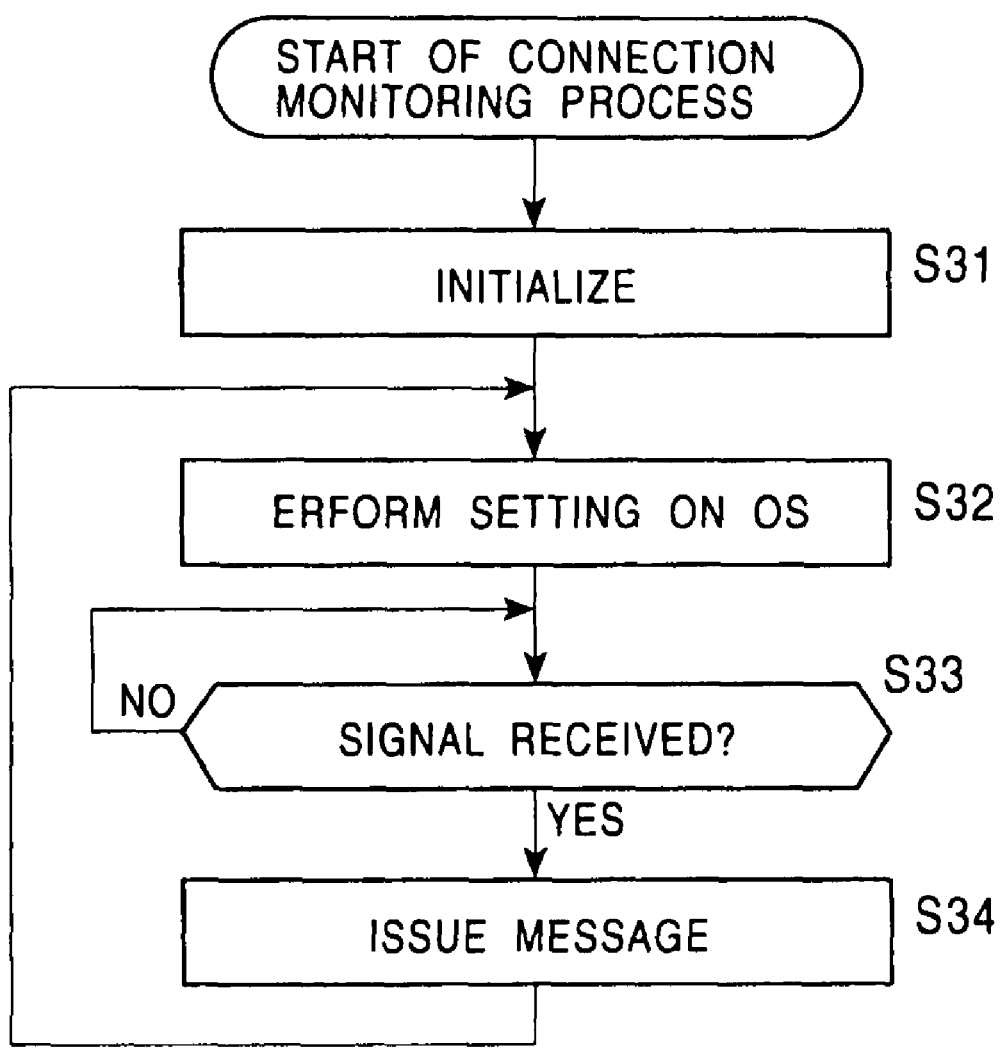
FIG. 7 is a flow diagram illustrating a process for monitoring connections of networks.

FIG. 7 is a flow diagram illustrating a process for monitoring connections of networks 2 performed in step S11. In step S31, an initialization is performed. The initialization is performed at the moment the switcher 51 starts residing in the terminal 10. For example, the count of the counter 93 (see FIG. 5) is reset to zero in the initialization in step S31.

In step S32, a setting is performed to an operating system (OS). The OS may be Windows XP (Trademark of the Microsoft Corporation). The setting to the OS performed in step S32 is a process of notifying the OS of a change (NotifyRouteChange) if there is a change in a routing table. The routing table is a file in which the optimum path for packet transmission in a packet exchange network is listed.

The routing table is updated each time the setting of the network is changed. The routing table is thus used to detect any change in the network.

The change in the network includes changing the type of network, for example, switching from a wired LAN to a wireless LAN. The interfaces connected to the network are also changed. Also contemplated is switching from one network to another network having a different gateway although the network remains unchanged from the same wireless LAN type. A change takes place in portions other than the interfaces.

The updating of the network may be detected by detecting the switching of the interfaces, and thus the network update is detected without using the routing table. For example, an actually connected one of the network interfaces of the terminal 10 shown in FIG. 2 is detected. Specifically, one of the wireless LAN interface 19, the wired LAN interface 20, and the modem 21 actually connected to the network 2 (see FIG. 1) is detected to determine whether an interface switching has been actually performed. This determination may be executed by polling the interfaces.

Another method is contemplated in which the change of a driver of a network interface is reported. The determination of the network switching is made in response to the report of the change of the driver. In yet another method, a flow of packets is monitored at the level of the transmission control protocol/Internet protocol (TCP/IP).

Each of the polling method, the driver change method, and the method of monitoring the packet is difficult to implement in the actual system in terms of circuit mounting thereof. In contrast, the method of using the routing table uses the currently used routing table, and it is relatively easy to implement the method in terms of the circuit mounting thereof.

The use of the routing table provides the following advantages.

Even when the terminal 10 has a plurality of network interfaces connected to a plurality of networks (such as a wired LAN and a wireless LAN), only one of the networks actually transmits and receives packets. The number of network interfaces in use is also one, and the network interfaces other then the one in use do not exchange packets. What network interface is used depends on the type of the network interface and the order according to which the network interface is connected to the network.

The routing table contains information as to what network interface is used, and what network the terminal 10 is connected to. Using the routing table, the change of the network is exactly detected.

Regardless of when the terminal 10 is connected to a plurality of networks (for example, when a plurality of wireless LANs are connectable because the plurality of wireless LANs are organized in proximity thereto, or when a wireless LAN and a wired LAN are connected), or when the terminal 10 is connected to a single network only, the use of the routing table allows the network actually exchanging packets to be identified in a similar method.

The timing of updating the routing table is considered as a timing at which the terminal 10 switches from a network to a next network. It is thus possible to detect the switching (changing) of the network on a real-time basis.

The network switching is determined using the routing table in the following embodiments.

Returning to the flow diagram illustrated in FIG. 7, the switcher 51 performs, in step S32, a setting to cause the OS to report a change in the routing table (the setting to issue a signal) if the change is added to the routing table. In step S33, the switcher 51 starts to determining whether the signal is received.

The switcher 51 waits on standby in step S33 until the signal is received. If the switcher 51 determines in step S33 that the signal is received, the message 92 (see FIG. 5) is sent to the processor 94 in step S34.

When the network switching is detected and when the message 92 is sent, the switcher 51 loops to step S32 to repeat the steps subsequent thereto. The detection of the network switching is continuously performed (the monitoring process continues).

While the monitoring process for monitoring the network switching is performed, the switcher 51 sets the counter in step S12 (see FIG. 6). More specifically, the switcher 51 issues a command to instruct the counter 93 to increment the count thereof by one while detecting the network switching and sending the message 92. In response to the command, the counter 93 increments the count thereof by one.

Figure 8:
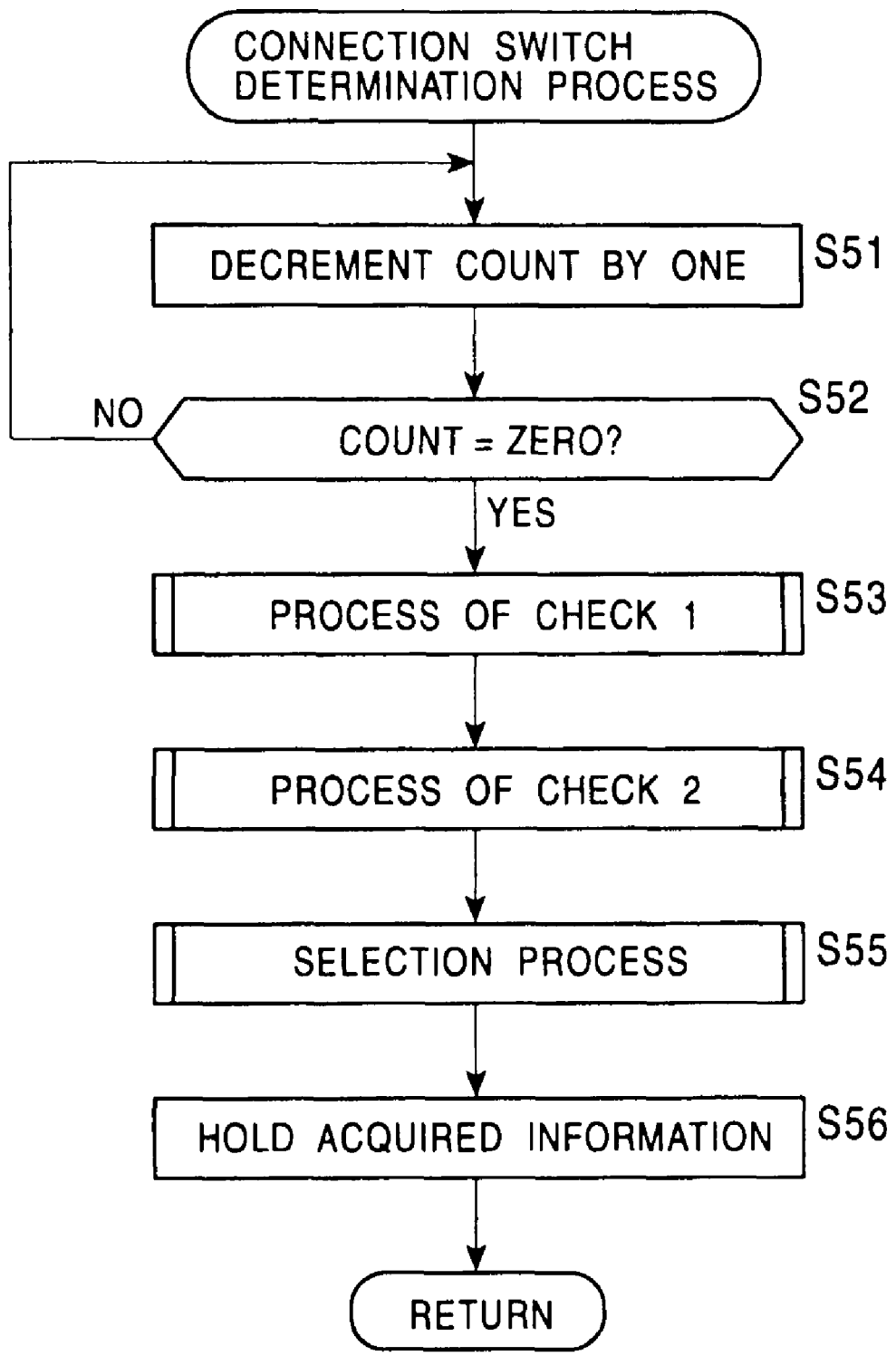
FIG. 8 is a flow diagram illustrating a process for determining network connection switching.

When the count of the counter 93 is incremented by one, the switcher 51 determines in step S13 whether or not to switch the network. FIG. 8 is a flow diagram illustrating a process for determining network switching in step S13. The determination of the network switching is performed by the processor 94 (see FIG. 5) which receives the message 92.

In step S51, the processor 94 decrements the count of the counter 93 by one. In step S52, the processor 94 determines whether the decrementing of the count by one results in zero (whether the count is zero). Steps S51 and S52 are performed for the following reason.

Figure 9:
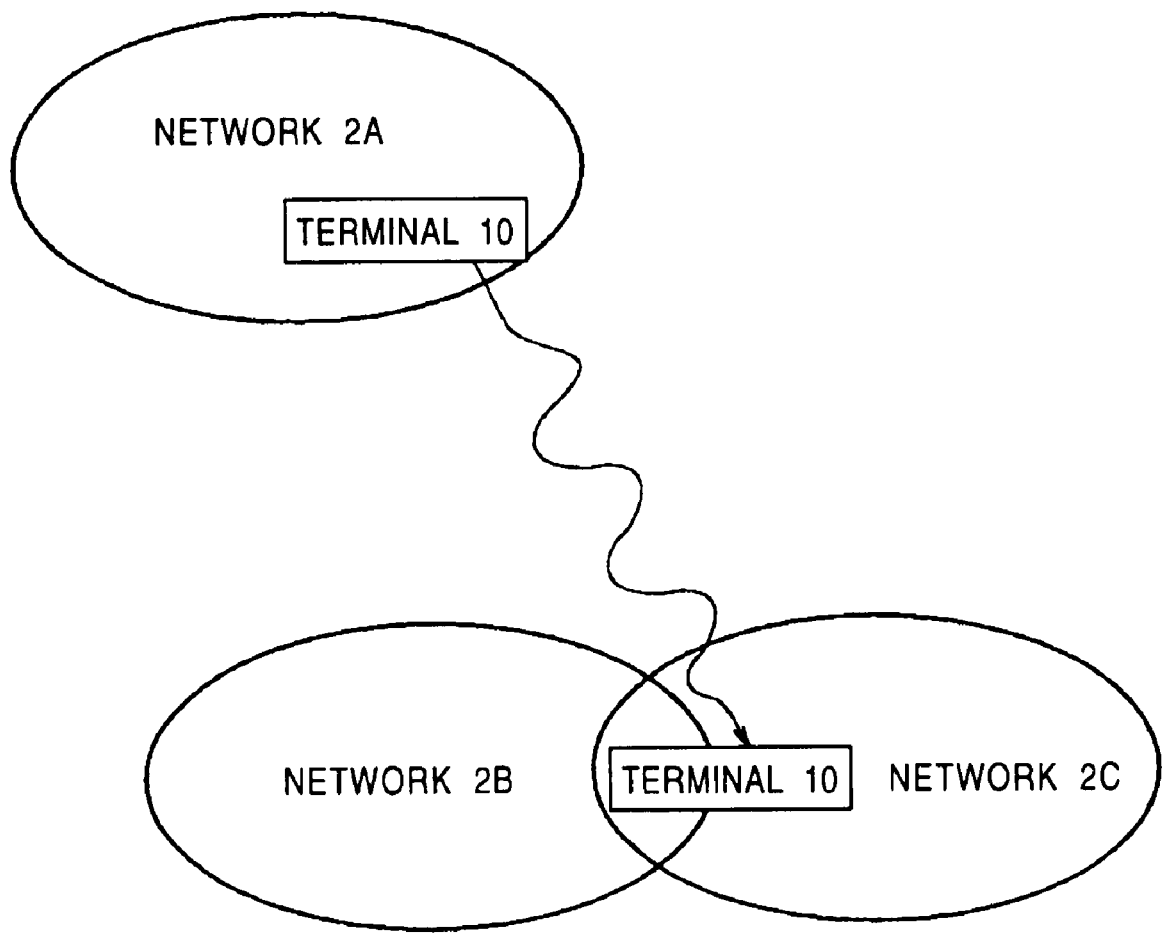
FIG. 9 is a flow diagram illustrating a movement of a terminal from one network to another.

FIG. 9 shows networks 2A through 2C, each of which is a wireless LAN. It is assumed that a coverage area of the network 2A (represented by an ellipse encircling the network 2A) overlaps neither a coverage area of the network 2B nor a coverage area of the network 2C.

However, the coverage area of the network 2B overlaps the coverage area of the network 2C. In this arrangement, the terminal 10 has moved into an overlap of the coverage area of the network 2B and the coverage area of the network 2C from the coverage area of the network 2A.

There is no limitation on the order of connection switching. It is contemplated that the connection of the terminal 10 is shifted from the network 2A to the network 2B, and then from the network 2B to the network 2C. Two network switching operations are consecutively performed. The switcher 51 detects the two consecutive network switching operations.

Upon detecting a network switching operation, the switcher 51 switches the connection to the detected network as will be discussed later. In this case, the connection switching is performed twice consecutively. However, the connection to one of the network 2B and the network 2C is sufficient, and the connection to the other is unnecessary.

If the two connection switching operations are performed consecutively, in other words, if the process of consecutive connection switching operations is set to be permitted, the switching process is frequently made. The workload imposed on the terminal 10 becomes large. The frequent network switching processes are problematic in terms of reliability of network connection.

Steps S51 and S52 are carried out in view of this drawback. Referring to FIG. 9, the network connection switching is detected consecutively, and the message 92 is sent consecutively. The count of the counter 93 is incremented consecutively.

The process performed in steps S51 and S52 is discussed again with reference to FIG. 9. When the terminal 10 shifts from the network 2A to the network 2B, the message 92 is first sent, causing the counter 93 to set 1 thereon. When the terminal 10 shifts from the network 2B to the network 2C, the message 92 is sent, causing the counter 93 to increment the count by 1 to 2.

When the process in step S51 is performed with the count of the counter 93 being at 2, the count becomes 1. When the process in step S52 is performed, the switcher 51 determines that the count is not zero. The process in step S51 is performed again, thereby setting the count to be zero. When the process in step S52 is performed, the processor 94 determines that the count is zero, and then the algorithm proceeds to step S53.

The algorithm does not proceed to subsequent steps until the processor 94 determines in step S52 that the count is zero. Even if the terminal 10 is shifted consecutively from network to network, only the process required to connect to the network as a final connection is executed. This arrangement reduces the workload on the terminal 10, and improves the reliability of the network connection.

Figure 10:
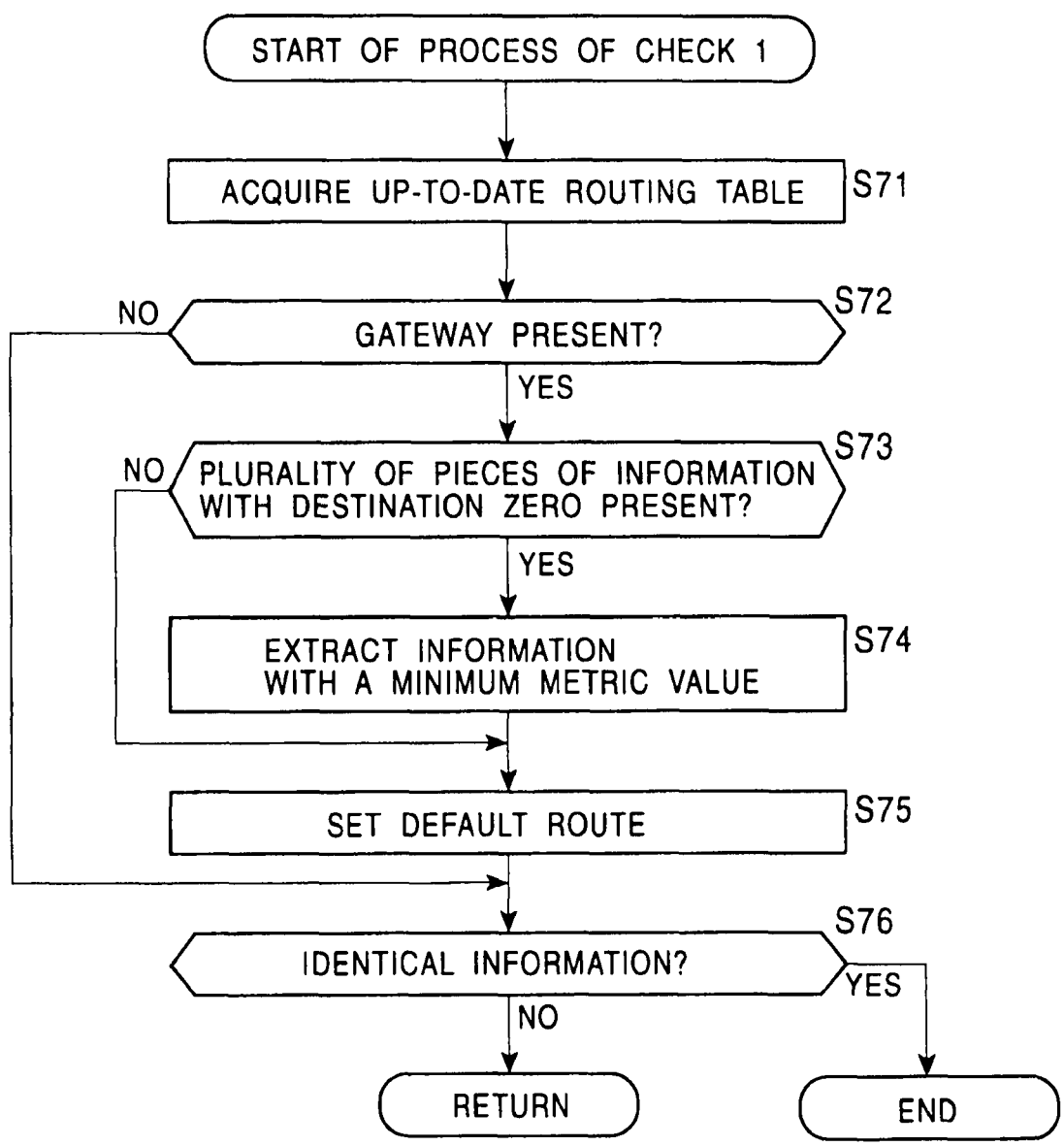
FIG. 10 is a flow diagram illustrating in detail a process of a check 1.

Returning to the explanation of the flow diagram illustrated in FIG. 8, the algorithm proceeds to step S53 if the processor 94 determines in step S53 that the count is zero. The process of check 1 is performed. FIG. 10 is a flow diagram illustrating in detail the process of the check 1 performed in step S53.

In step S71, an up-to-date routing table is acquired. The up-to-date routing table is the one valid at the moment the process of the check 1 is performed. At the moment the process is performed, the routing table contains a routing description to a new destination.

Immediately prior to the acquisition of the up-to-date routing table in step S71, the routing table relating to the network connected prior to the network switching was acquired prior to the storage of the routing description to the new destination. This routing table is now referred to as an immediately prior routing table. The immediately prior routing table had been acquired before the issue of the message 92 (namely, before the detection of the change of the network). For example, the immediately prior routing table is acquired in the initialization in step S31 (see FIG. 7), and held in the processor 94.

A specific example of the routing table acquired in step S71 is shown in FIG. 11. Numbers on the leftmost column in the routing table are listed for explanation only, and are not contained in the actual routing table.

The routing table lists destinations, netmasks, gateways, interfaces, and metrics. Destination information "0.0.0.0." on a first row and a second row represents a gateway 1 used to connect to an external network.

The routing table shown in FIG. 11 shows that two gateways 1 are present. The terminal 10 is connectable with two networks through two network interfaces.

The routing table shown in FIG. 11 will now be referenced in the following discussion as necessary. Returning to a flow diagram shown in FIG. 10, the processor 94 determines in step S72 whether or not the gateway 1 is present after the routing table is acquired in step S71 as shown in FIG. 11. As already discussed, this determination is performed referencing the destination information in the routing table. More specifically, the processor 94 determines whether there is destination information of "0.0.0.0".

If the processor 94 determines in step S72 that there is the gateway 1, the algorithm proceeds to step S73. The processor 94 determines whether or not there are a plurality of pieces of the destination information of "0.0.0.0". More specifically, the processor 94 determines whether the terminal 10 is connectable with a plurality of gateways 1. The processor 94 determines, based on the routing table illustrated in FIG. 11, that there are a plurality of pieces of destination information of "0.0.0.0", and proceeds to step S74.

In step S74, a minimum of metric is extracted. Information relating to the metric is also contained in the routing table illustrated in FIG. 11. If the OS is Windows (tradename), a network and a network interface connected thereto having a smaller metric value have higher priority over those having a larger metric value. In other words, a smaller metric value has a higher priority over a larger metric value.

The wired LAN has a smaller metric value than the wireless LAN in a standard OS level. Optionally, the priority setting may be left to the user's choice.

Referring to FIG. 11, the routing table lists two pieces of the destination information of "0.0.0.0" determined as being gateways 1. The metric value of the gateway 1 at the first row is "20," and the metric value of the gateway 1 at the second row is "30." The gateway 1 described at the first row is thus extracted in step S74.

When the gateway 1 having the minimum metric value is extracted in step S74, the algorithm proceeds to step S75. In step S75, the network destination having the smallest extracted metric value is set as a default route. The route through the gateway 1 at the first row in the routing table illustrated in FIG. 11 is set as a default route.

The process in step S75 is also reached if the switcher 51 determines in step S73 that there are no plurality of pieces of destination information of "0.0.0.0." In this case, there is only one gateway 1. If the algorithm proceeds from step S73 to step S75, the route through the gateway 1 with no other same gateway present is set as a default route.

In step S76, the processor 94 determines whether the information about the gateway 1 described in the immediately prior routing table held in the processor 94 (the information relating to the route to the gateway 1 prior to the network switching) is identical to the default route information set in step S75 (the information of the route to the gateway 1 identified in the up-to-date routing table).

The process in step S76 is performed for the following reason. The execution of the process in step S76 means that a change of the network is detected in a prior step. The connection to the network may be repeatedly made or broken. A change of the network may be erratically detected during such an unstable connection period, although the network is not changed in fact (with the same network connected in an on and off fashion).

The process in step S76 is performed to determine whether or not the network has been actually changed.

The process in step S76 is taken if the processor 94 determines in step S72 that no gateway 1 is present. For example, when a local network unconnected to an external network needs no gateway 1, the processor 94 may determine that no gateway 1 is present.

A server having a function such as a dynamic host configuration protocol (DHCP) may not be contained in the network 2. Since the processor 94 can acquire no information about the gateway 1 in the network 2, the processor 94 may determines that no gateway 1 is present.

In a point-to-point connection such as one of a connection in compliance with the IEEE 1394 standards, a serial connection, and a parallel connection, and in a point-to-point connection in a wireless LAN, the processor 94 may also determine that no gateway 1 is present.

When the terminal 10 is placed in such a network 2, the user may use a particular apparatus such as a personal computer (PC) in the network 2 as an information source to identify the network 2.

The user may designate and store an IP address, an MAC address, and a host name of any PC present in the network 2 as the profile 53 to identify the network 2 from which the address of the gateway 1 cannot be acquired. These pieces of information may be used to identify the network 2 containing no gateway 1.

Returning to the flow diagram illustrated in FIG. 10, the above-referenced information is acquired from the routing table acquired in step S72 if the processor 94 determines in step S71 that no gateway 1 is present. The process in step S76 is performed using the acquired information.

An affirmative answer to the determination in step S76 means that the network 2 is not changed as a connection destination, and a process for switching the network 2 is not required. The processor 94 ends the process without performing a subsequent process relating to the switching of the network 2.

Figure 12:
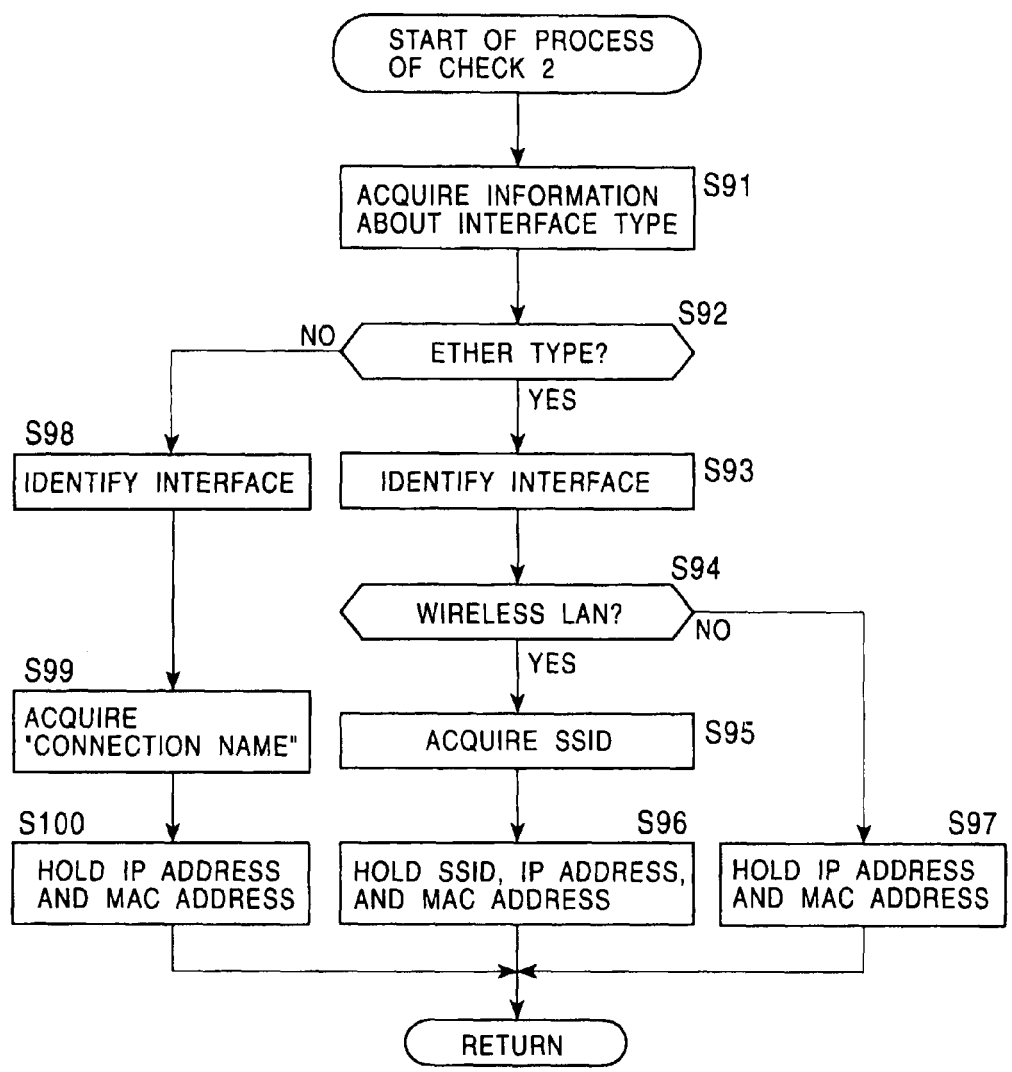
FIG. 12 is a flow diagram illustrating in detail a process of a check 2.

A non-affirmative answer to the determination in step S76 means that the network 2 is changed as a connection destination, and the processor 94 continuously performs the process relating to the switching of the network 2. The algorithm proceeds to step S54 (see FIG. 8) to execute the process of a check 2. FIG. 12 is a flow diagram illustrating in detail the process of the check 2 performed in step S54.

In the process of the check 2, the default information set in the check 1 process is used to define, more in detail, information relating to the gateway 1 as a default route. The information to be used in definition includes a media access control (MAC) address of the gateway 1 and an IP address of the gateway 1.

The MAC address is a physical address unique to a network card. The MAC address is 6 bytes long in an Ethernet (tradename). Leading 3 bytes as a vendor code are defined and managed in the IEEE standards. The remaining 3 bytes are managed by a vendor itself (without any duplication). All Ethernet interfaces are different, and there is no other Ethernet interface having the same physical address worldwide. In the Ethernet, data exchange is performed using the MAC address.

In step S91, the processor 94 acquires information relating to the type of an interface connected to the gateway 1 set as a default route. Available as interfaces as shown in FIG. 2 are the wireless LAN interface 19, the wired LAN interface 20, and the modem 21. In step S91, the processor 94 acquires information identifying which of these interfaces is connected to the gateway 1.

The information relating to the type of interface is acquired as a reply (InterfaceIndex) from the OS when a command is input to the OS. The processor 94 (see FIG. 5) identifies the type of the interface by acquiring the index.

Based on the acquired index, the processor 94 determines in step S92 whether the interface connected to the network 2 is an Ether type such as the wireless LAN interface 19 or the wired LAN interface 20. If the processor 94 determines that the interface is an Ether type, the processor 94 then determines in step S93 whether the interface is a wireless LAN or a wired LAN.

To identify the interface, a global unique ID (GUID) is acquired. The GUID is a unique value worldwide. In the Windows (tradename) environments, a class ID of an object is a 125-bit GUID with no duplication in other objects. Available as methods for generating such a value are a calculation method, and another method which uses a combination of an MAC address of the Ethernet interface (such as the wireless LAN interface 19 or the wired LAN interface 20) and date and time at which the MAC address is generated.

When the interface is identified using the GUID, the processor 94 determines in step S94 in accordance with the identification result whether or not the identified interface is the wireless LAN interface 19. If the processor 94 determines in step S94 that the identified interface is the wireless LAN interface 19, the algorithm proceeds to step S94 to acquire an service set identification (SSID).

The SSID is an identification number used to identify a communication partner in the wireless LAN. Apparatuses communicating each other use the SSID as a password to authenticate each other. Communication partners are unable to communicate each other without a match of the password. In step S95, the connected interface (the wireless LAN interface 19 in this case) acquires the SSID of the connected gateway 1, and the processor 94 receives the acquired SSID.

Upon receiving the SSID, the processor 94 acquires the SSID, the IP address and the MAC address of the gateway 1 connected at this point of time. These pieces of information are held in step S96.

If the processor 94 determines in step S94 that the identified interface is not the wireless LAN interface 19, in other words, if the processor 94 determines that the identified interface is the wired LAN interface 20, the algorithm proceeds to step S97. Since the wired LAN interface 20 requires no SSID, the process for acquiring the SSID is not required. The IP address and the MAC address of the gateway 1 are already acquired at the process in step S97. The processor 94 holds the acquired IP address and MAC address.

If the processor 94 determines in step S92 that the type of the interface connected to the network 2 is not an Ether type, the algorithm proceeds to step S98. The interface is identified in step S98. The interface is identified as being the modem 21 or an interface (of the IEEE 1394 standards, for example) to be connected to a particular personal computer, although not shown in FIG. 2. When the interface is identified, a connection name of a remote access service (RAS) is acquired in step S99.

The connection name is discussed here. The user typically contracts with a predetermined Internet service provider (ISP) when the modem 21 is used for communication. If the user contracts with the ISP, information required to connect to the server of the ISP, including the IP address, the MAC address, and a telephone number, is set, and held in the terminal 10. The user manages the information held in the terminal 10, such as a provider name (So-net (tradename), for example), in a manner that uniquely identifies the information. The name used to manage the information is referred to the connection name.

The connection name (host name) of the interface to be connected to a particular apparatus may be provided by the user. Managed by the connection name are an IP address and an MAC address of a particular apparatus.

When the connection name is acquired, the IP address and the MAC address of the gateway 1 or the particular apparatus are acquired. The information such as these addresses is held in the processor 94 in step S100.

The information relating to the gateway 1 is acquired based on the type of the interface connected to the gateway 1 and is then held. The information, which is held in the processor 94 through the process of the check 2 illustrated in FIG. 12, is discussed again. The acquired information includes the MAC address (referred to as information 1), the IP address (referred to as information 2), the SSID (referred to as information 3), and the connection name (information 4) of the gateway 1 in the network 2.

When the connection is established with the gateway 1 through the wired LAN interface 20, information 1 through 3 is acquired. When the connection is established with the gateway 1 through the wireless LAN interface 19, the information 1 and 2 is acquired. When the connection is established with the gateway 1 through the modem 21, the information 1, 2, and 4 is acquired. Depending on the type of the interface connected to the gateway 1, the type of the interface becomes different.

The information 1 and 2 is acquired regardless of the interface type. More specifically, the MAC address and the IP address of the gateway 1 are acquired. The MAC address and the IP address of the gateway 1 are discussed further.

Since one gateway 1 is typically present in one network 2, the MAC address and the IP address may be used to identify the network. Which of the MAC address and the IP address to use to identify the network is a concern.

For example, when an asymmetric digital subscriber line (ADSL) modem (having a router function) is used at home, a default IP address of a gateway (attached at the manufacture thereof) is typically set to be the same address, for example, "129.168.0.1."

In a network installed in a predetermined area such as a corporate office, a private IP address "192.168.x.x" is assigned to users on a group by group basis, such as on a floor by floor basis, on a business by business basis in an internal LAN. The user assigns the IP address relatively freely.

In view of such a situation, the same IP address can be commonly used by different networks 2. The IP address alone is unable to uniquely identify (recognize) the gateway 1.

The use of the MAC address is better to identify the gateway 1. The MAC address, which is a unique ID as already discussed, is able to uniquely identify the gateway 1.

The user may desire to identify two physically different networks 2 as the same network 2. For example, the same company currently uses IP addresses different from floor to floor in the same building. The user may use the same IP address to identify the two physically different networks 2 as the same network 2.

The SSID is an ID to be used in the wireless LAN. As the IP address is not appropriate, the SSID is not appropriate either for use as information to uniquely identify the gateway 1 (the network 2). The SSID may be used to treat different networks 2 as the same network 2.

For example, with the same SSID, wireless LANs in respective floors in the same company building may have the same setting. The terminal 10 remains connected to the wireless LANs without changing the setting. If a group of stores which provides a hotspot service has the same SSID, the user may enjoy the same service with the same setting among the stores. Each of the stores provides the same service.

The "connection name" during the modem connection is uniquely provided by the user on the terminal 10. The network 2 is thus uniquely identified by designating the connection name.

Each item of information acquired and held in the process represented by the flow diagram in FIG. 12 has its own feature, which is considered in the following process.

Returning to the flow diagram in FIG. 12, one of steps S96, S97, and S10 is performed, and information such as the addresses is acquired and held. The processor 94 then returns to step S55 (see FIG. 8).

The processor 94 performs a selection process in step S55. Up until now, the information relating to the then connected network 2, namely, the information relating to the gateway 1 has been acquired. The information alone acquired up until now is unable to establish the connection for actually exchanging data (the connection to enjoy the service provided over the network 2).

For example, when a communication is in progress through the modem 21, the server of the ISP performs an authentication process as to whether the terminal 10 having the modem 21 is the terminal 10 contracting with the ISP subsequent to the establishment of the connection to the gateway 1 (subsequent to the first phase connection). The authentication process requires information such as a password. Without inputting the password (without transmitting the password to the ISP), data exchange over the network 2 cannot be started.

To proceed to the connection to the network 2 for data exchange (to the establishment of the second phase connection), the processor 94 must not only identify the then connected gateway 1, but also determine what network 2 the gateway 1 is arranged in, and determine and acquire what information is required to reach the connection.

If the terminal 10 was once connected to the network 2 in the past, then if the network 2 is already registered in the terminal 10 in response to an instruction of the user, the information required to reach the second phase connection is held in the profile 53 (see FIG. 3). The profile 53 includes information of a plurality of registered networks 2 and data corresponding thereto. It is necessary to identify the network 2 connected at this point of process, and select appropriate data. This process is the selection process to be performed in step S55.

Figure 13:
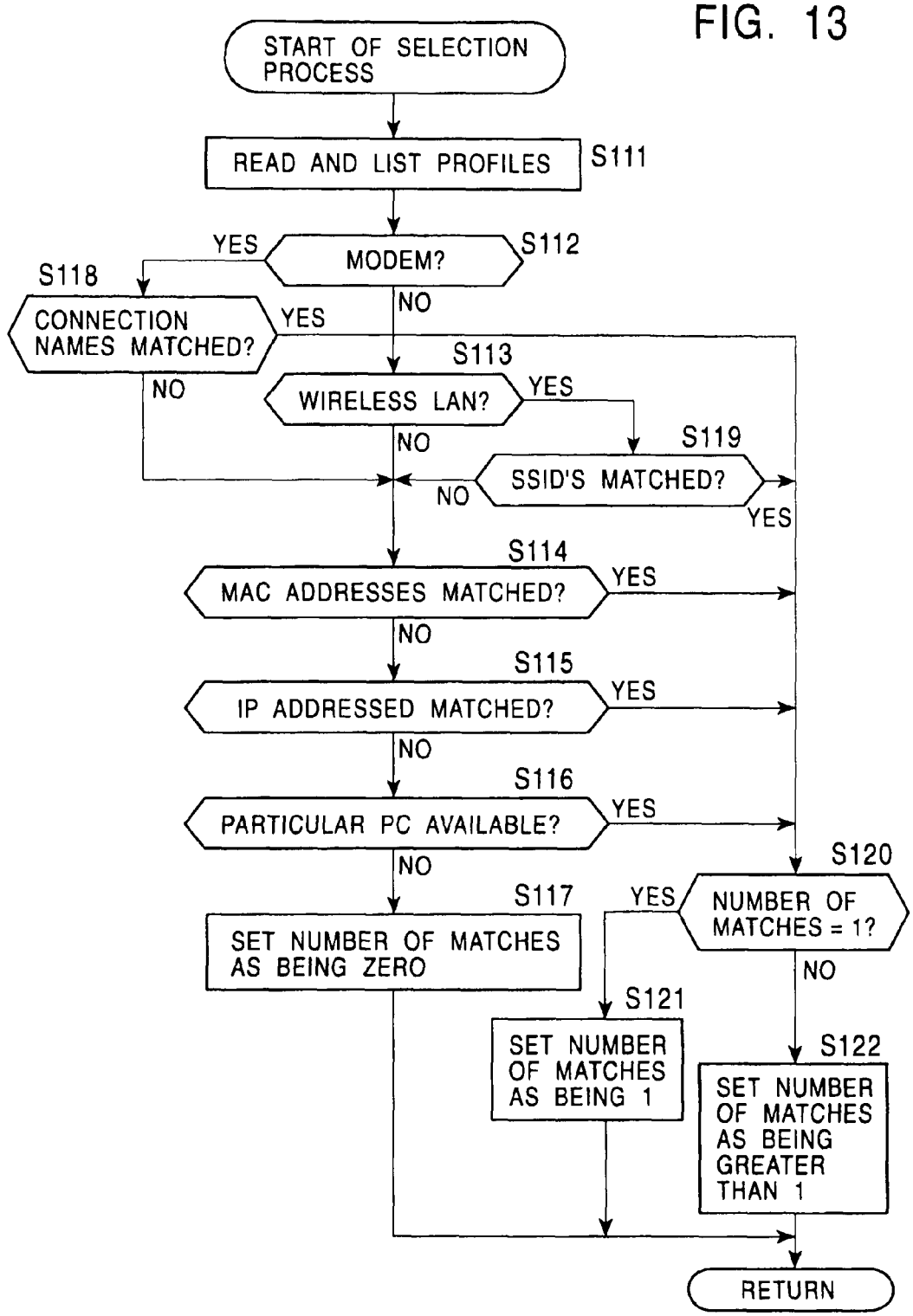
FIG. 13 is a flow diagram illustrating in detail a selection process.
Figure 16:
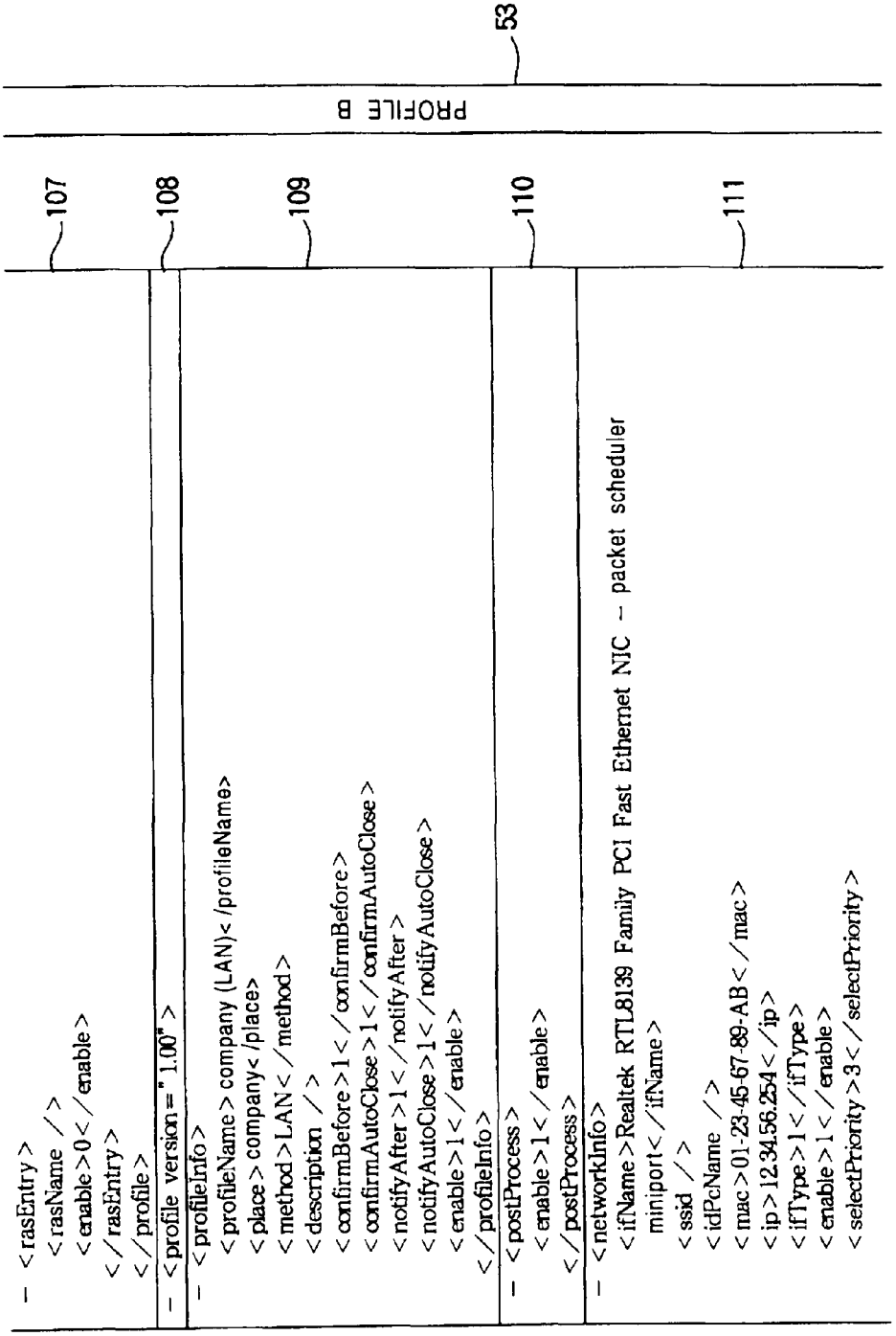
FIG. 16 specifically illustrates the profile.
Figure 17:
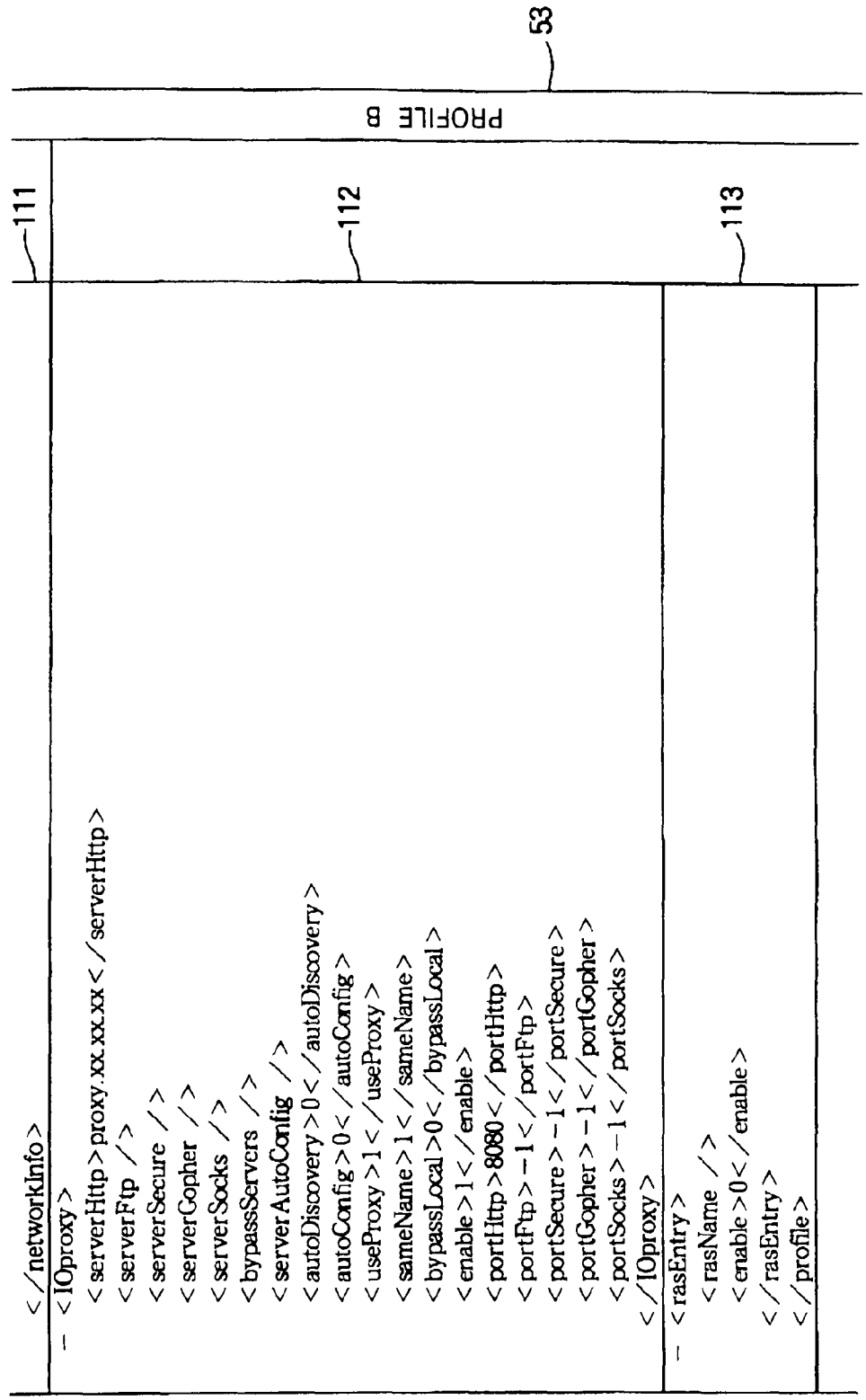
FIG. 17 specifically illustrates the profile.

FIG. 13 is a flow diagram illustrating in detail the selection process to be performed in step S55. In step S111, the processor 94 reads and lists the profile 53 (see FIG. 3) stored in the storage 18. The profile 53 will now be specifically discussed.

FIGS. 14 through 19 illustrate specific examples of the profile 53. The profile 53 shown in FIGS. 14 through 19 contains information relating to three networks 2. Three pieces of information relating to the three networks 2 are respectively referred to as a profile A, a profile B, and a profile C. The profile 53 shown in FIGS. 14 through 19 are divided into a plurality of blocks by border lines. In practice, there are no such border lines in the profile 53. The blocks do not exist and are used for convenience of explanation only.

The profile 53 is first discussed briefly and specifically. The profile 53 will be discussed in detail later together with a status under which the profile 53 is used, and a process of generating the profile 53.

Information representing a start of the profile 53 is provided in a block 101 as a leading section of the profile 53 (see FIG. 14). A block 102 describes a version of the profile A that follows. Blocks 103 through 107 contains information relating to the profile A.

The block 103 contains information such as a name of the profile A (the name of the network 2) named by the user. The block 104 contains information relating to a program starting subsequent to the establishment of connection to the network 2 indicated in the profile A.

The block 105 of the profile (see FIG. 15) contains the MAC address and the IP address of the gateway 1 in the network 2. The block 106 contains information relating to the setting of a proxy in the Internet. The block 107 (see FIG. 16) contains information relating to the communication by the modem.

The profile B is composed of blocks 108 through 113. The profile C is composed of blocks 114 through 119. The basic structure of each of the profiles B and C is identical to that of the profile A. Information contained therewithin is different from profile to profile.

The block 120 (see FIG. 19) contains information representing the end of the profile 53.

The profile 53 is read and listed in step S111. In the listing of the profile 53, information (blocks) required to perform step S112 and subsequent steps is extracted from the profile 53 shown in FIGS. 14 through 19 and is then listed. Although a listed profile 53 is used in step S112 and subsequent steps, the profile 53 shown in FIGS. 14 through 19, as a source of the listed profile 53, is essentially used, and the profile 53 shown in FIGS. 14 through 19 is thus referenced as appropriate in the discussion that follows.

The processor 94 determines in step S112 whether information such as the IP address finally held in the process of the check 2 is the one relating to the modem 21. This determination is performed using the result of the process of the check 2. More specifically, when it is determined that InterfaceType is RAS, the processor 94 determines in step S112 that the held information relates to the modem 21.

If the processor 94 in step S112 determines that the held information does not relate to the modem 21, the algorithm proceeds to step S113. The processor 94 determines in step S113 whether the held information relates to the wireless LAN interface 19. This determination is also performed by determining whether InterfaceType performed in the process of the check 2 relates to the wireless LAN.

If the processor 94 determines in step S113 that the held information does not relate to the wireless LAN, the algorithm proceeds to step S114. If the held information does not relate to the modem nor the wireless LAN, the processor 94 determines that the held information relates to one of the wired LAN and the particular PC. In any case, the MAC address is held.

The processor 94 determines in step S114 whether the MAC address contained in the held information matches one in the listing generated in step S111. The MAC address is described in the block 105, the block 111, and the block 117 of the profile 53 shown in FIGS. 14 through 19.

The block 105, the block 111, and the block 117 contain information relating to the network managed by the profile A, information relating to the network managed by the profile B, and information relating to the network managed by the profile C. In the discussion that follows, the blocks of the profile A also represents those of the profile B and the profile B because the information described in the profile A, the information described in the profile B, and the information described in the profile C are substantially identical to each other.

The block 105 of the profile A contains the information relating to the network of the profile A. Specifically, a name of an interface device is described at an <ifName> row. The name of the interface device is basically managed by the OS. In the example shown in FIG. 15, the name of the interface device is "Wireless LAN interface."

The <ifName> row is followed by an <SSID> row. For the wireless LAN, a specific SSID value is described. As shown in FIG. 15, a specific SSID value is "1234." The block 111 of the profile B shown in FIG. 16 describes no SSID value because the profile B is not for the wireless LAN (the information on the row right above indicates a wired LAN).

Described at a next row <idPcName> in succession to the SSID information is a name of an apparatus expressed as the particular apparatus in the above discussion. The particular apparatus is the one that is in the network 2 and has information for identifying the network 2. If such an apparatus is set, a host name of the apparatus is described at the row.

Described at a next row <mac> is the MAC address of the gateway 1, which is "00-00-00-00-00-00" in the block 15 as shown in FIG. 15. Returning to the flow diagram illustrated in FIG. 13, the processor 94 uses this information in the determination in step S114. More specifically, the MAC address at this row is listed, and the processor 94 determines whether the MAC address to be processed at the point of time matches one in the listing. The number of matches is counted.

The content of the profile 53 is continuously discussed. An <ip> row, arranged in succession to the MAC address row in the block 105, describes the IP address. The IP address is "0.0.0.0" in the block 105 shown in FIG. 15.

The <ip> row for the IP address is followed by an <ifType> row, where the type of an interface is described. Referring to FIG. 15, the <ifType> row contains "3" in the block 105. The type of the interface is represented in number. For example, the wired LAN is represented by 1, the modem is represented by 2, and the wired LAN is represented by 3. Referencing this information determines what interface the profile is related to.

The interface type row is followed by an <enable> row, where whether <networkInfo> described in the block 105 is enabled or not is described. This row typically provides 1 to indicate an enabled state.

The row indicating whether the <networkInfo> is enabled or not is followed by a <selectPriority> row, where information relating to priority is described. The <selectPriority> row indicates 1 in the block 105 as shown in FIG. 15. The information provided here represents which search key the user has selected. The search key is set by the user. The search key indicates which information to use to identify the network, in other words, indicates which information to use in the search of information in the profile 53.

When the user selects the wireless LAN (SSID), the search key is 1. When the user selects the modem (connection name), the search key is 2. When the user selects the MAC address, the search key is 3. When the user selects the IP address, the search key is 4.

The SSID, the connection name, the MAC address, and the IP address have their own features. The network switching is preferably performed taking advantage of the features. For example, when the same service is provided among a plurality of branch offices of a company, the same SSID may be set. The user simply recognizes the network with the same SSID if the user desires to receive the same service among different networks of different branch offices. In other words, the SSID may be set as a search key.

If the MAC address is set as a search key, different networks of different branch offices are recognized as different networks. If such a setting is desired, the user may set the MAC address as a search key.

The search key is set to the user's own preference, and the set information is then placed at a <selectPriority> row. The setting of the information may be performed referencing a screen to be discussed later.

The above-referenced information is described in the profiles as the information relating to the network.

Returning to the flow diagram illustrated in FIG. 13, the processor 94 determines in step S114 whether the held MAC address (to be processed) contained in the information is found in the listing. The information having the MAC address set therewithin, namely, the information of the <selectPriority> having 3, is extracted from the listing as the search key.

The processor 94 determines whether the MAC address contained in the held information matches the one described at the <mac> row in the extracted information. If the processor 94 determines in step S114 that the MAC address is not found in the listing, the algorithm proceeds to step S115. The processor 94 determines in step S115 whether the IP address contained in the held information matches one in the listing. This determination is also performed in the same way as the determination of the MAC address in step S114.

For example, information with the <selectPriority> having 4 is extracted from the listing. It is then determined in step S115 whether the IP address contained in the held information matches the one described at the <ip> row in the extracted information. If it is determined in step S115 that the IP address in the held information is not found in the listing, the algorithm proceeds to step S116.

It is then determined in step S116 whether the held information relates to information concerning a particular apparatus, and that the information is found in the listing. As already discussed, the particular apparatus is set up in a network 2 having no gateway 1 therewithin to identify the network 2. The information may include the MAC address, the IP address, and the host name. Since it has already been determined that both MAC address and IP address in the held information are not found in the listing, the processor 94 determines in step S116 whether the host name is used.

If the processor 94 determines in step S116 that the information relating to the particular apparatus is not found in the listing, the algorithm proceeds to step S117. When the processor 94 determines up until now that the held information is not found in the listing, the number of matches of zero is set.

If the processor 94 determines in step S112 that the held information relates to the modem, the algorithm proceeds to step S118. The processor 94 determines in step S118 whether the matching connection name is found in the listing. First, information designating the RAS is extracted from the listing. The information designating the RAS is the information <selectPriority> having 2.

If the information <selectPriority> having 2 is found, that information is extracted. The processor 94 determines whether the connection name to be processed is found to match the one in the extracted information. With reference to the profile 53 illustrated in FIGS. 14 through 19, the information to be used in the determination is the block 107 in the profile A (see FIG. 16), the block 113 in the profile B (see FIG. 17), and the block 119 in the profile C (see FIG. 19).

The blocks 107, 113, and 119 in the respective profiles thereof present information, as a <rasEntry>, for modem connection. Since the profile A relates to the wireless LAN, the <rasEntry> row in the block 107 is left blank. Since the profile B relates to the wired LAN, the <rasEntry> row in the block 113 is left blank.

In contrast, the block 119 in the profile C contain corresponding information. Since the profile C relates to the modem, the block 119 contains the following information as the <rasEntry>.

Figure 19:
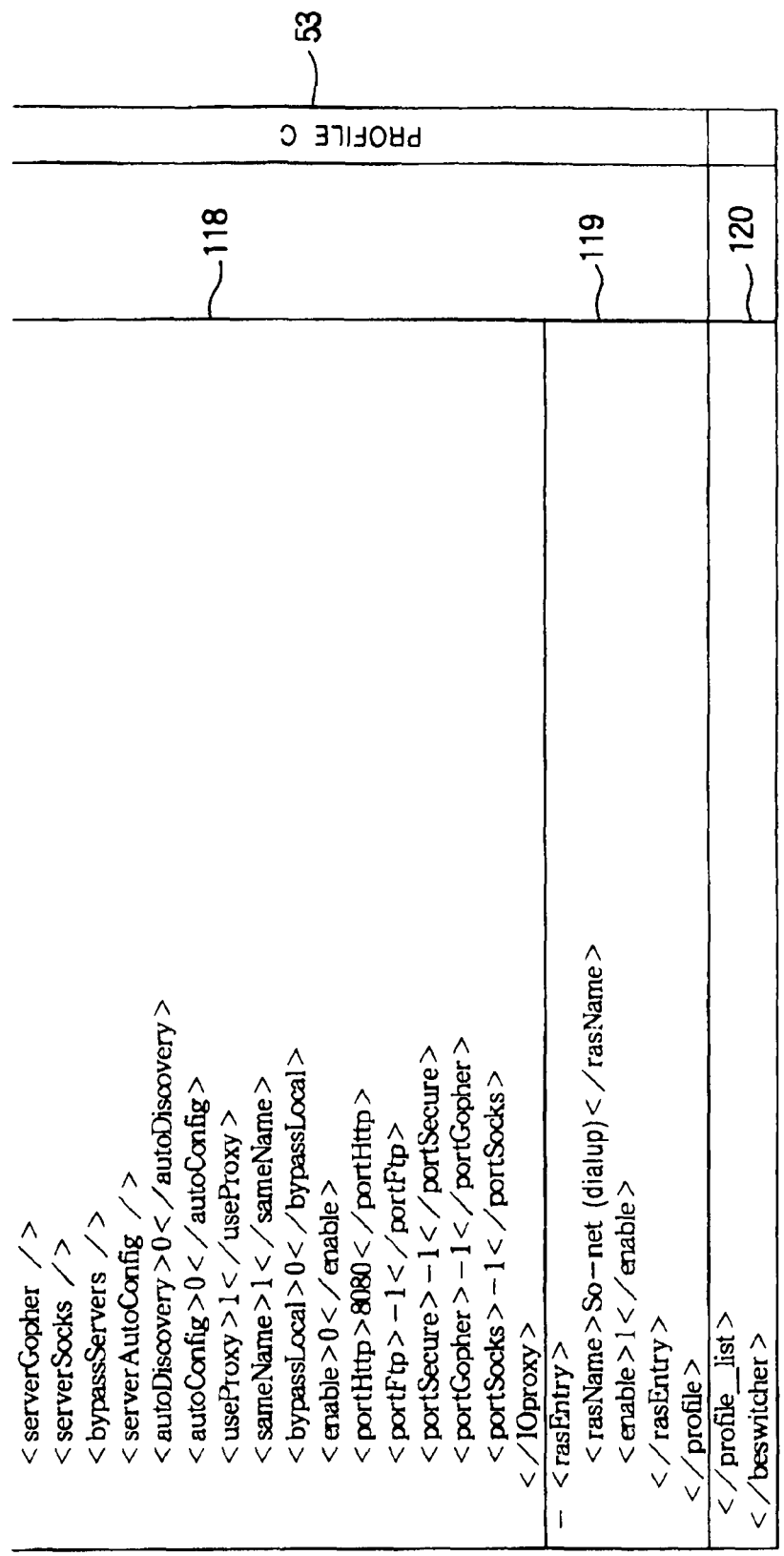
FIG. 19 specifically illustrates the profile.

The <rasEntry> row describes a connection name named by the user. The block 119 shown in FIG. 19 provides "So-net (dial-up)."

Information is provided at a next row of <enable> to indicate whether or not the entry is valid. If the profile C relates to the modem (the <ifType> in the block 117 is 2 (indicating the modem), for example), and if the connection name is set, the entry is set to 1 as being valid. If the profile is not related to the modem, or if the connection name is not set, the entry is set to be zero as being not valid.

The process in step S118 is thus performed using these pieces of information. If the processor 94 determines that the connection name to be processed is not found in the listing, the algorithm proceeds to step S114. The process in step S114 and subsequent steps has already been discussed.

If the processor 94 in step S118 determines that the connection name to be processed is found in the listing, the algorithm proceeds to step S120. Other processes performed prior to proceeding to step S120 are discussed before the discussion of the process in step S120.

If the processor 94 in step S113 determines that the held information is related to the wireless LAN, the algorithm proceeds to step S119. The processor 94 determines in step S119 whether the information of the wireless LAN (SSID) to be processed matches any information in the listing. The process in step S119 is basically identical to that in step S114 or step S118.

More specifically, information with the wireless LAN (SSID) set therewithin, namely, the information with the <selectPriority> set to 1 is extracted from the listing as a search key.

The processor 94 determines whether the SSID contained in the held information matches the one described at the <ssid> row in the extracted information. If the processor 94 determines in step S119 that no match is found in the listing, the algorithm proceeds to step S114. The process in step S114 and subsequent steps has already been discussed.

If the processor 94 determines in step S119 that the SSID contained in the held information matches the one described in the listing, the algorithm proceeds to step S120. If it is determined in step S118 that the connection name contained in the held information is found in the listing, the algorithm also proceeds to step S120.

If it is determined in step S114 that the MAC address contained in the held information is found to match the MAC address in the listing, the algorithm also proceeds to step S120.

If it is determined in step S115 that the IP address contained in the held information is found to match the IP address in the listing, the algorithm also proceeds to step S120.

If it is determined in step S116 that the information relating to the particular apparatus contained in the held information is found to match the information in the listing, the algorithm also proceeds to step S120.

In this way, as long as part of the held information is found to match the information in the listing, the algorithm proceeds to step S120. In other words, there is a possibility that the connected gateway 1 matches the gateway 1 registered in the profile 53.

The processor 94 determines in step S120 whether or not the number of pieces of matching information is one. As already discussed, the MAC address is able to uniquely identify the gateway 1, but the IP address may be assigned to a plurality of different gateways. The IP address is unable to uniquely identify the gateway 1.

A plurality of profiles of different networks having the same IP address may be stored in the listing. The processor 94 determines in step S120 whether the number of pieces of matching information is one, in other words, determines in step S120 whether a single gateway 1 is identified.

If it is determined in step S120 that the number of pieces of matching information is one, the number of matches is set to be one in step S121. If it is determined in step S120 that the number of pieces of matching information is not one, the number of matches is set to be at least two in step S122.

When the number of matches between the information to be processed and the information in the listing is set in step S117, step S121, or step S122, the algorithm proceeds to step S56 (see FIG. 8).

Information of candidate networks as a destination of network switching is extracted in the process prior to step S56. A process to determine an actual destination network from among the candidate networks is performed. The information acquired prior to step S56 is held in step S56 before determining the actual destination network. A network switching process is continuously performed based on the information acquired prior to step S56. But the acquired information is held in step S56, and then the processor 94 undergoes step S14 (see FIG. 6).

The processor 94 determines in step S14 whether or not the count of the counter 93 is zero. The same determination as the one to be performed in step S14 has been already performed in the flow diagram of the connection switch determination process illustrated in FIG. 8. As already discussed with reference to FIG. 9, the process in steps S51 and S52 is performed to prevent consecutive network switching when the change of networks is repeatedly detected.

The process in steps S51 and S52 is performed as part of the connection switch determination process. The process illustrated in FIG. 8 is performed as the connection switch determination process in step S13 in the flow diagram illustrated in FIG. 6.

While the connection switch determination process in step S13 is performed, a change to a new network may be detected, a message 92 may be transferred, and the count of the counter 93 may be incremented. For the same reason why the process in steps S51 and S52 discussed with reference to FIG. 9 is performed, the process in step S14 is also performed. In other words, the process in step S14 is carried out not to consecutively switch the networks.

If the counter 93 determines in step S14 that the count of the counter 93 is not zero, the algorithm loops to step S13, and the subsequent process is repeated. A non-zero count of the counter 93 means that a connection to a new network is detected during a relatively short period of time of the process in step S13. The algorithm returns to step S13 not to switch the network, and the same process is performed on the newly detected network.

If it is determined in step S14 that the count of the message 92 is zero, in other words, if it is determined that no connection to a new network is detected during the process until step S13, the algorithm proceeds to step S15.

The progress to step S15 means that a network switching process in step S16 is to be performed. In a pre-process in step S15 before the network switching process, an immediately prior routing table is updated to a route for a network to which the terminal 10 is switched in step S16. The immediately prior routing table is the one prior to the detection of a change of the network as already discussed with reference to the flow diagram of the process of the check 1 shown in FIG. 10.

Figure 20:
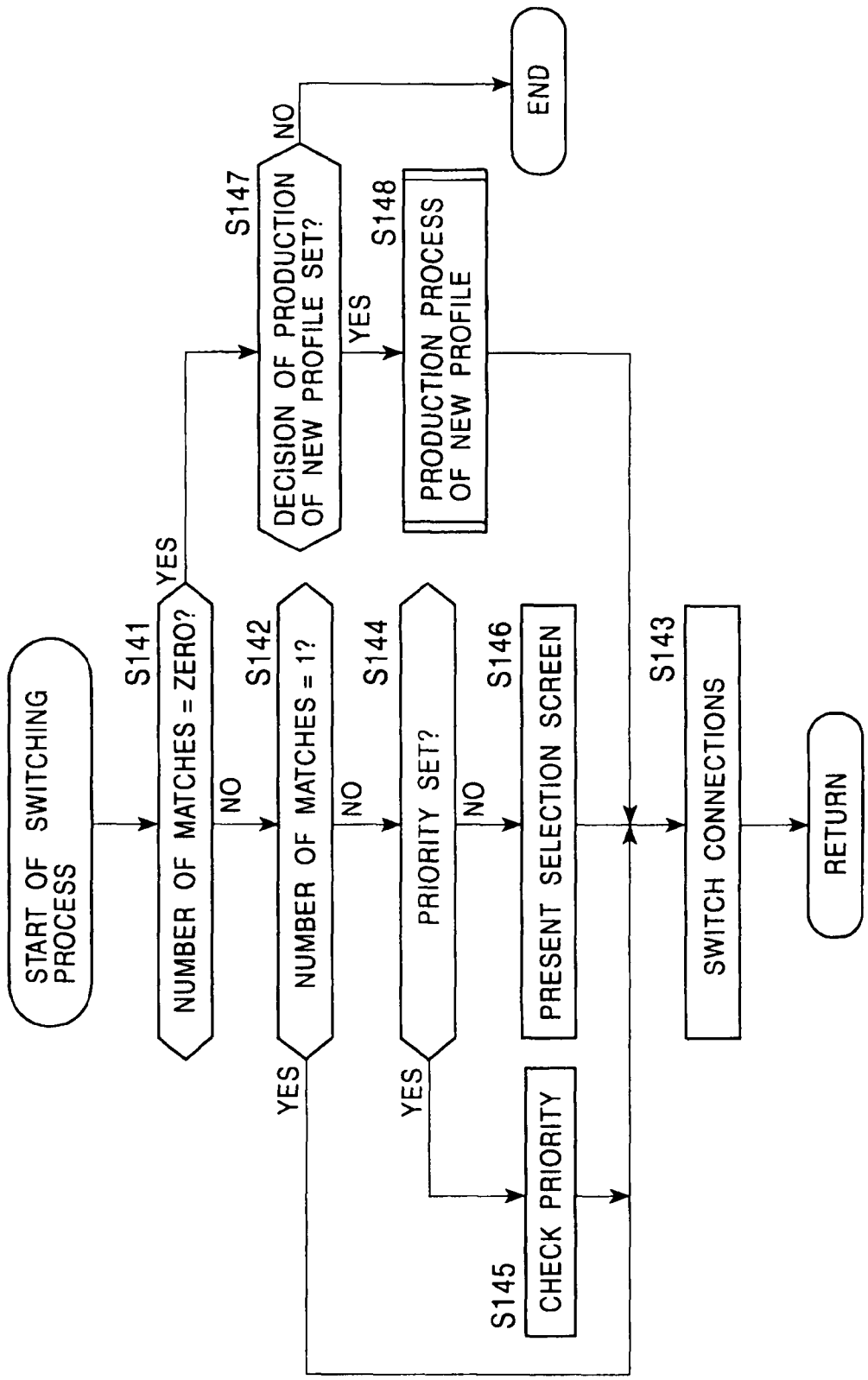
FIG. 20 is a flow diagram illustrating in detail a network switching process.

When the updating of the immediately prior routing table is completed in step S15, the network switching process is performed in step S16. FIG. 20 is a flow diagram illustrating in detail the network switching process in step S16.

The processor 94 determines in step S141 whether the number of matches held in the process in step S56 is zero. If it is determined in step S141 that the held information does not indicate zero, the processor 94 determines in step S142 whether the held information indicates one.

If it is determined in step S142 that the held information indicates the number of matches of one, in other words, if a network is stored and fixed as a detected connection destination as a profile in the profile 53, the algorithm proceeds to step S143.

The network switching process to the fixed network is performed in step S143. In step S143, the processor 94 (see FIG. 5) in the switcher 51 commands the profile manager 52 (see FIG. 3) to read the profile of the fixed network from the profile 53 stored in the storage 18.

In response to a command from the switcher 51, the profile manager 52 reads the profile of the fixed network as the connection destination from the profile 53. The processor 94 switches to the network as a connection destination based on the read profile. The network switching refers to the establishment of the connection through which a service is enjoyed in the finally connected network.

For example, when the network is switched to the connection through the modem 21 illustrated in FIG. 2, the modem 21 is connected to the gateway 1, and is further connected to the server of the ISP present beyond the gateway 1. The server of the ISP performs an authentication process. The terminal 10 is thus connected into a state that allows the terminal 10 to use the Internet through the server.

When the terminal 10 is switched to the modem 21 from the wireless LAN interface 19, a password for use in the authentication process is read in step S143. The password is then sent to the server of the ISP. The connection of the terminal 10 is established to the degree that the terminal 10 enjoys the service provided by the network.

If it is determined in step S142 that the held information does not indicate the number of matches of one, the algorithm proceeds to step S144. If step S144 is reached, the held information indicates the number of matches of at least 2, and a plurality of candidate networks are detected as connection destinations. The processor 94 determines in step S144 whether the plurality of detected candidate networks as the connection destinations are prioritized.

The priority of the networks may be set by the user or by the OS.

If it is determined in step S144 that the candidate networks are prioritized, the algorithm proceeds to step S145. The priority of the plurality of candidate networks as the connection destinations is checked in step S145. The network having the highest priority is extracted. If the network having the highest priority is extracted, the algorithm proceeds to step S143.

The process in step S143 is performed on the network that is extracted as having the highest priority. The discussion of the process in step S143 is not repeated here.

If it is determined in step S144 that the networks are not prioritized, the algorithm proceeds to step S146. In step S164, a selection screen is presented. If step S146 is reached, the detected candidate networks as the connection destinations are not prioritized, and the switcher 51 is unable to determine which network to perform the connection process on. The switcher 51 presents a screen on the display 61 to urge the user to select a connection destination.

Referring to the presented screen, the user selects the network. The selected network is thus set. The process in step S143 is performed on the set network. The discussion of the process in step S143 is not repeated here.

If it is determined in step S141 that the held information indicates the number of matches of zero, a profile relating to the network detected as the connection destination is neither produced as the profile 53, and nor stored in the storage 18.

If it is determined in step S141 that the held information indicates the number of matches of zero, the algorithm proceeds to step S147. In the process in step S147 and subsequent steps, a new profile of a newly detected network is produced. The processor 94 determines in step S147 whether the production process of the new profile is set. The production process of the new profile is set by the user.

For example, if the user walks in a street where hotspots are ubiquitous, the terminal 10 may frequently detect networks of the hotspots, and may produce frequently new profiles. However, the user may desire the network of a predetermined hotspot, and may not desire to register all hotspots.

Producing profiles within a predetermined range, for example, within the predetermined number, or within a predetermined place suffices for the user. The user may desire to produce no further new profiles after the profiles within the predetermined range have been produced.

A decision as to whether to produce a new profile is left to the user. The processor 94 determines in step S147 whether the decision to produce the new profile is set. If it is determined in step S147 that the decision to produce the new profile is not set, the user neither desires the production of the new profile, and nor desires the connection to the new network. Without performing the network switching process, the processor 94 ends the process.

If it is determined in step S147 that the decision to produce the new profile is set, the algorithm proceeds to step S148. The production of a profile relating to the newly detected network starts. The production process of the new profile in step S148 will be discussed with reference to a flow diagram illustrated in FIG. 21.

The profile produced as a result of the production process of the new profile in step S148 is used in the above-referenced process from the next time. When the process in step S148 is completed, the algorithm proceeds to step S143. The network switching process is performed to switch to the network the profile of which has been produced. The discussion of the process in step S143 is not repeated here.

The production process of the profile performed in step S148 is discussed with reference to the flow diagram illustrated in FIG. 21. This production process is performed by the profile manager 52. In step S161, the profile manager 52 presents, on the display 61 of the terminal 10, a start screen which allows the user to recognize the start of the profile production for a new network. FIG. 22 illustrates an example of the start screen presented on the display 61 for letting the user know the start of the profile production of the new network.

A network unregistered in the profile 53 is detected before the start screen shown in FIG. 22 notifying the user of the start of the profile production is presented. Alternatively, a screen asking a question of whether to produce a profile of that network may be presented before starting the production of the new profile, and when a command in reply to the question is given, the start screen illustrated in FIG. 22 may be presented.

The screen illustrated in FIG. 22 displays a text to allow the user to recognize the start of the production of the new profile. Shown below the text are a "back" button 101, a "next" button 102, a "cancel" button 103, and a "help" button 104.

The back button 101 is operated to return to a preceding screen. Since the start screen illustrated in FIG. 22 has no preceding screen, the back button 101 is disabled. The next button 102 is operated to proceed to a next screen. The cancel button 103 is operated to quit the production process of the new profile. The help button 104 is operated to clarify a question concerning the production process.

Figure 21:
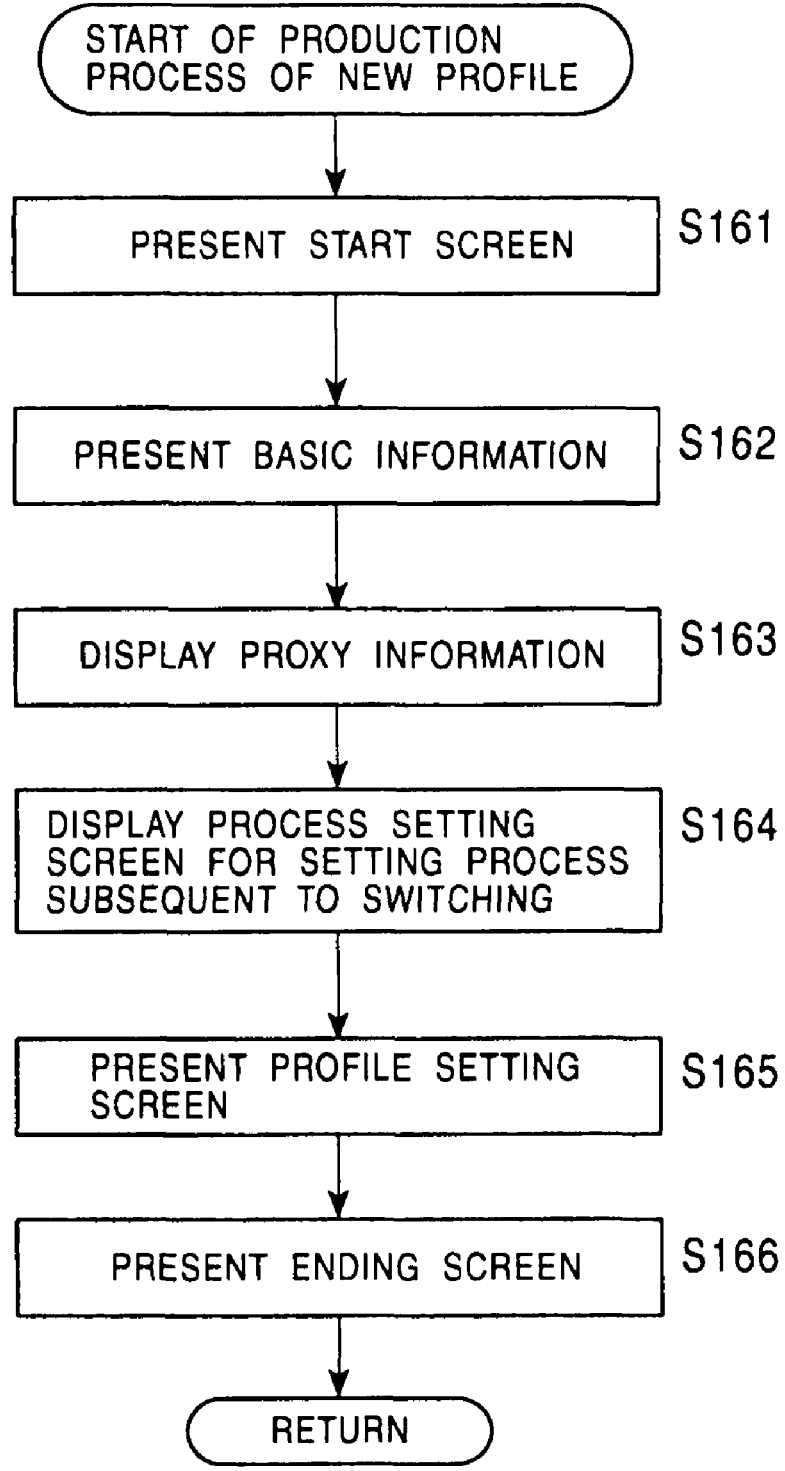
FIG. 21 is a flow diagram illustrating in detail a process for producing a new profile.
Figure 22:
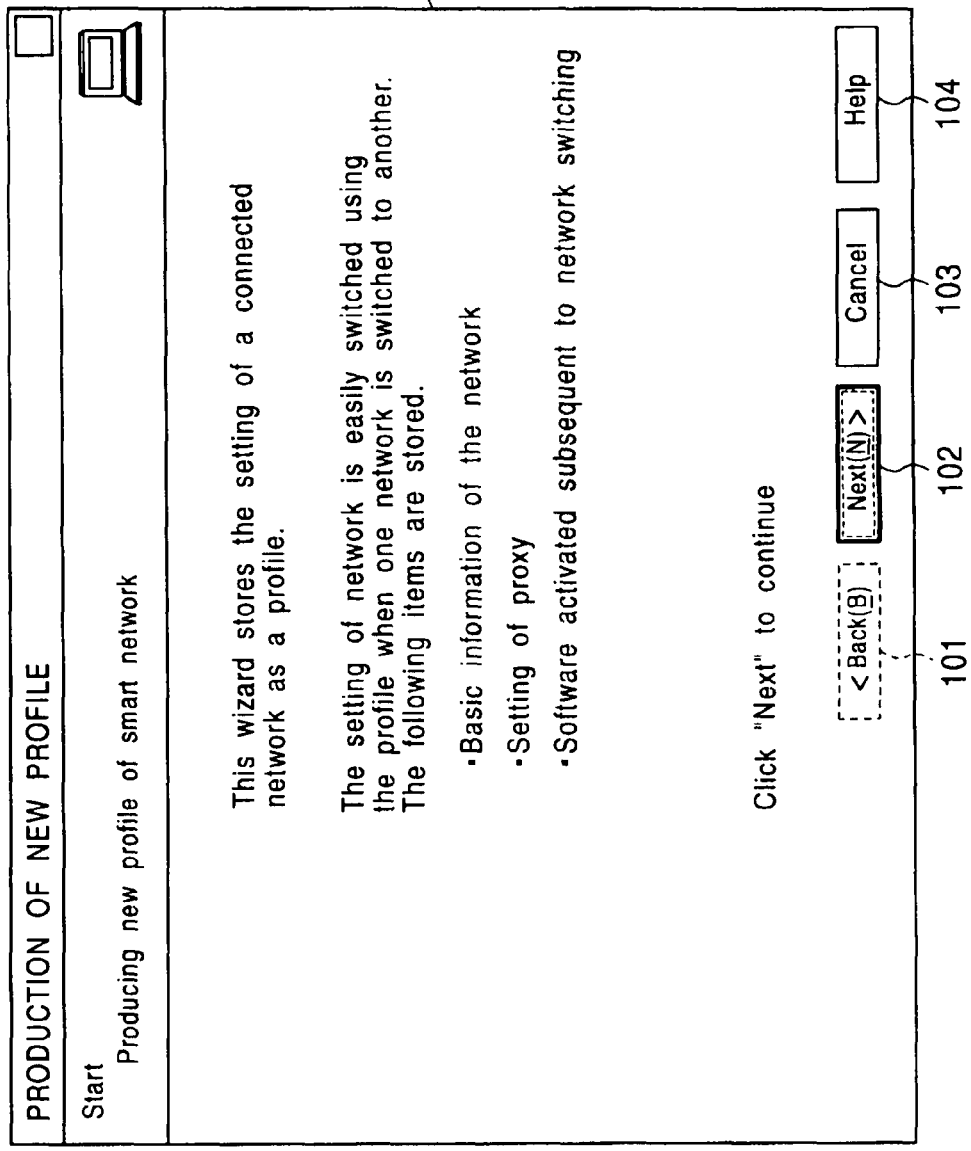
FIG. 22 illustrates an example of a screen presented on a display.
Figure 23:
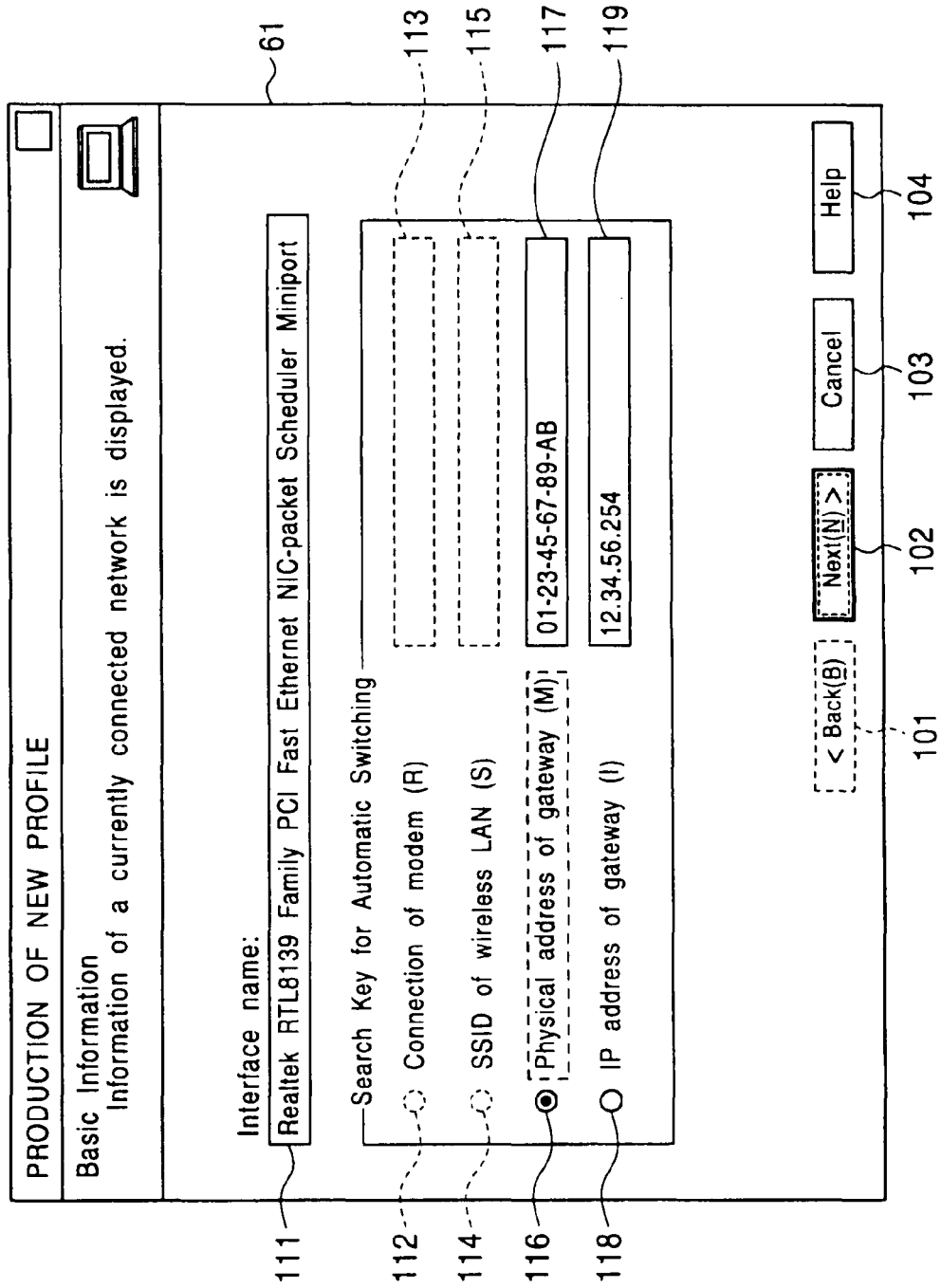
FIG. 23 illustrates an example of the screen presented on the display.

When the next button 102 is operated on the screen illustrated in FIG. 22, the algorithm proceeds to step S162 (see FIG. 21). Basic information is presented in step S162. FIG. 23 illustrates an example of the screen showing the basic information. Currently acquired information relating to the network is presented on the screen illustrated in FIG. 23.

An interface name box 111 labeling the name of an interface appears on the screen. The interface name box 111 shows the name of the interface of the terminal 10 then connected to the network. The content in this box cannot be modified by the user, and is described at the <ifName> row in the profile 53. For example, the profile 53 corresponding to the screen of FIG. 23 is described at corresponding row in the block 111 in the profile B illustrated in FIG. 16.

Arranged below the interface name box 111 is a search key setting section for automatic switching as shown in FIG. 23. The search key has already been discussed with reference to the flow diagram illustrated in FIG. 13. The search key is used to search the profile 53 for the profile of the connected network.

The search key setting section for the automatic switching includes a radio button 112 which is enabled during the connection through the modem, a modem information box 113 which shows information of the modem, a radio button 114 which is enabled during the connection through the wireless LAN, a wireless LAN information box 115 which shows information of the wireless LAN, a radio button 116 which is enabled during the acquisition of a physical address of the gateway (the MAC address), an MAC address box 117 which shows the MAC address, a radio button 118 which is enabled during the acquisition of the IP address of the gateway, and an IP address box 119 which shows the IP address.

The radio button 112 is enabled only when the modem connection is active. The radio button 112 is disabled in FIG. 23 because the modem connection is not active. The modem information box 113 displays the connection name of the network connected through the modem only when the modem connection is active.

The content displayed at the modem information box 113 is provided on the <rasName> row in the profile 53. In the screen illustrated in FIG. 23, the modem information box 113 is disabled providing no information because the modem connection is not active. When the modem information box 113 is enabled with the modem connection active, the connection name corresponding to the block 119 of the profile C illustrated in FIG. 19 is provided there.

The radio button 114 is enabled only when the connection through the wireless LAN is carried out. Since the connection is not established through the wireless LAN in the screen illustrated in FIG. 23, the radio button 114 is disabled. The wireless LAN information box 115 shows the SSID of the wireless LAN only when the connection is established through the wireless LAN.

The content displayed at the wireless LAN information box 115 is also displayed at the <ssid> row in the profile 53. The input/output interface 15 is disabled presenting no content because the connection is established not through the wireless LAN. When the wireless LAN information box 115 is enabled with the connection established through the wireless LAN, the SSID presented on the corresponding row in the block 105 of the profile A shown in FIG. 15 is described.

The radio button 116 and the radio button 118 are enabled when the MAC address and the IP address are acquired, respectively. The MAC address box 117 of the gateway shows the MAC address, and the IP address box 119 shows the IP address.

The MAC address shown in the MAC address box 117 is provided at the <mac> row in the profile 53, and the IP address shown in the IP address box 119 is provided at the <ip> row in the profile 53. The profile 53 corresponding to the screen shown in FIG. 23 is described at corresponding rows in the block 111 of the profile B illustrated in FIG. 16.

The items shown in the modem information box 113, the wireless LAN information box 115, the MAC address box 117, and the IP address box 119 cannot be modified by the user.

The screen of the basic information shown in FIG. 23 provides only the then acquired information of the network. In other words, information then not acquired (information not needed) is not displayed. In principle, there is no need for the user to modify the content displayed on the screen. The user simply recognizes the displayed information, and presses the next button 102.

Since the automatic switching search key is set at the MAC address as shown in FIG. 12, the MAC address radio button 116 only is on. The search key is modified up to the user's preference. To use a button other than for the MAC address, the user selects a desired button from within the enabled button. A desired search key setting is performed.

The information relating to the search key set in the automatic switching search key section (relating to the selected radio button) is provided at the <selectPriority> row in the profile 53. The profile 53 corresponding to the screen shown in FIG. 23 is described at the corresponding row in the block 111 of the profile B illustrated in FIG. 16. The <selectPriority> row in the block 111 provides the number "3" and the number "3" means that the MAC address is set as the search key.

Figure 24:
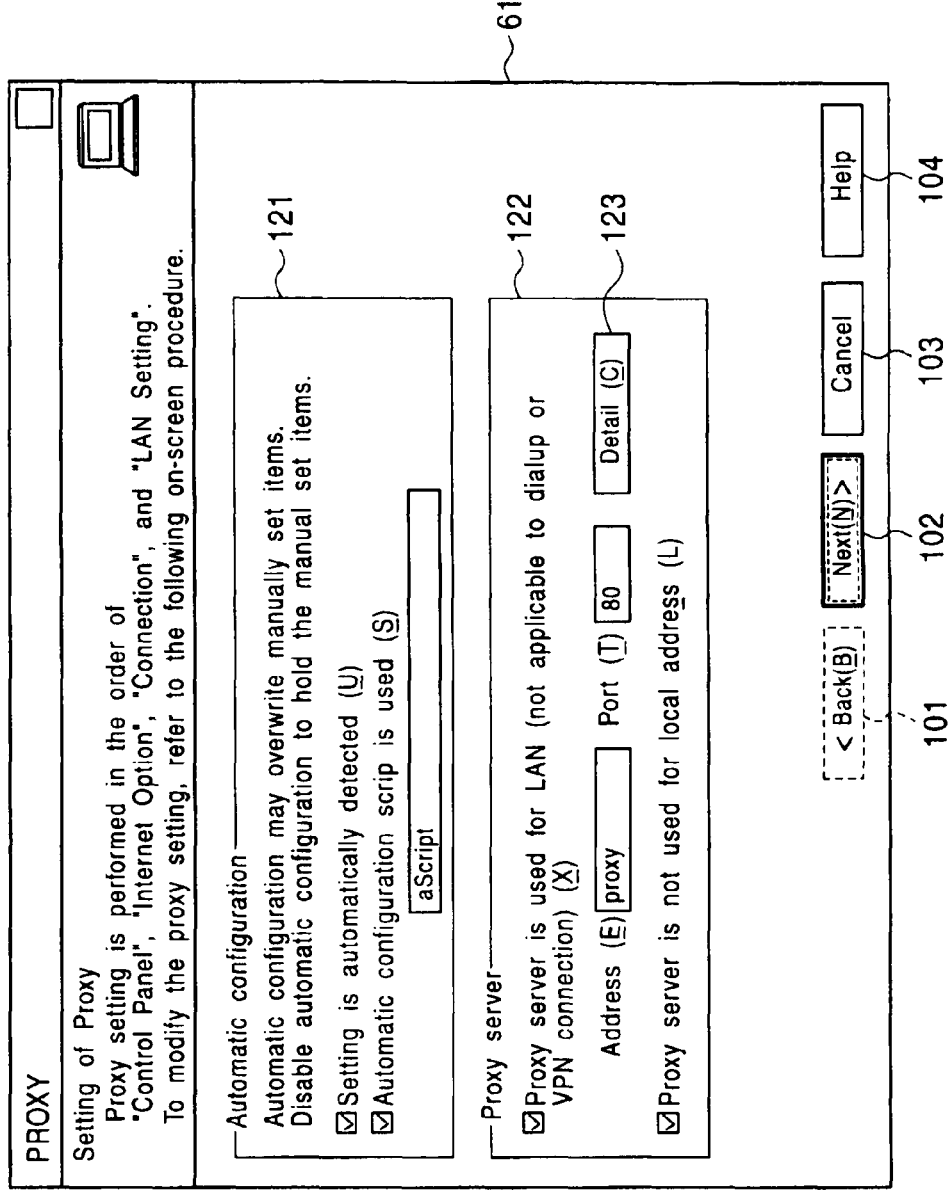
FIG. 24 illustrates an example of the screen presented on the display.
Figure 25:
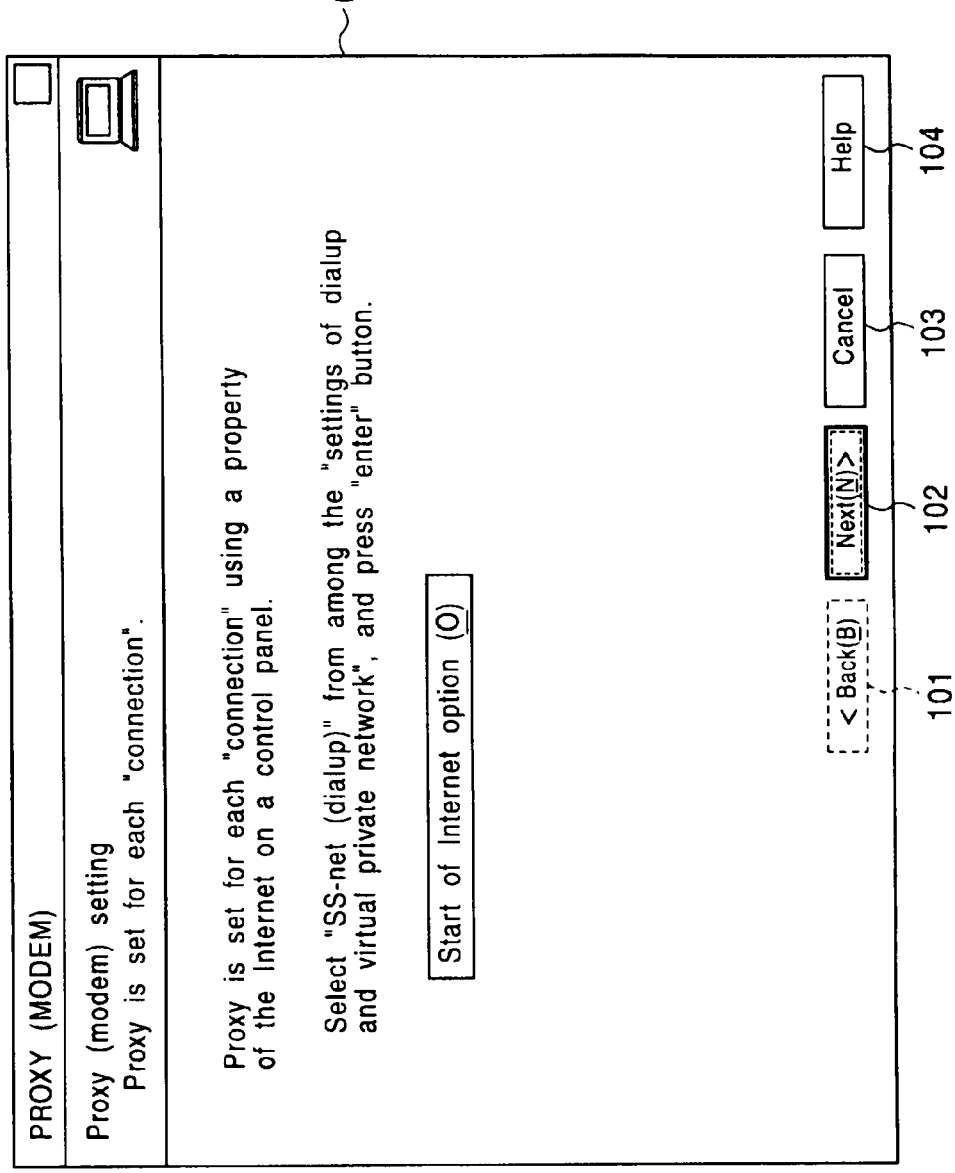
FIG. 25 illustrates an example of the screen presented on the display.

Referencing the screen illustrated in FIG. 23, the user sets a desired key, and operates the next button 102. Then, the algorithm proceeds to step S163. Proxy information is presented. FIGS. 24 and 25 show examples of the screen provided on the display 61 in step S163. FIG. 24 shows the example of the screen that is provided on the display 61 when the terminal 10 is connected to the network through one of the wireless LAN and the wired LAN. FIG. 25 shows the example of the screen that is provided on the display 61 when the terminal 10 is connected to the network through the modem.

The information the user sets referencing one of the screens illustrated in FIGS. 24 and 25 is described in the profile 53, for example, in the block 106 of the profile A illustrated in FIG. 15. The block 106 contains information relating to an <IOproxy>, namely, information relating to the setting of a proxy of an Internet option.

A server name of a hypertext transfer protocol (HTTP) proxy is described at a <serverHttp/> row. A sever name of a file transfer protocol (FTP) is described at a <serverFtp/> row. A server name of a secure proxy is described at a <serverSecure/> row. A server name of a Gopher is described at a <serverGopher/> row. A server name of Stocks is described at a <serverStocks/>.

As shown in FIG. 24, a proxy server section 122 is used to set information relating to a proxy server. Information from the <serverHttp/> row to the <serverStock/> row is set in another setting screen (not shown) on another window by operating a detail setting button 123 arranged in the proxy server section 122.

An address of a network accessed without using a proxy is described at a<bypassSevers/> row. Information (a script name) indicating the location of an automatic configuration script is described at a <serverAutoconfig/> row. Information relating to the setting as to whether to automatically detect a setting detected is described at a <autoDiscovery/> row. Information relating to the setting as to whether to use the automatic configuration script is described at an <autoConfig> row.

The information from the <serverAutoconfig/> to the <autoConfig> is set in the proxy server section 122 shown in FIG. 24 which is used to set information relating to the automatic configuration.

Information relating to the setting as to whether to use the proxy is described at a <useProxy> row. Information relating to the setting as to whether to use the same proxy to all protocols is described at a <sameName> row. Information relating to the setting as to whether to use the proxy in a local address is described at a <bypassLocal> row.

The information from the <useProxy> row through the <bypassLocal> row is set in the proxy server section 122 used to set the information of the proxy server as shown in FIG. 24.

Information indicating whether the IOproxy is valid or invalid is described at an <enable> row. A port number of a HTTP proxy is described at a <portHttp> row.

A port number of an FTP proxy is described at a <portFtp> row.

A port number of a secure proxy is described at a <portSecure> row.

A port number of a gopher proxy is described at a <portGopher> row.

A port number of stocks is described at a <portStocks> row.

As shown in FIG. 24, a proxy server section 122 is used to set information relating to a proxy server. Information from the <portHttp> row to the <portStocks> row is set in another setting screen (not shown) on another window by operating the detail setting button 123 arranged in the proxy server section 122.

If the user operates the next button 102 in one of the screens illustrated in FIGS. 24 and 25, the algorithm proceeds to step S164 in the flow diagram illustrated in FIG. 21. In step S164, the display 61 presents a screen for setting a process subsequent to the completion of the network switching process. The completion of the network switching process means the completion of the process in step S143 in the flow diagram illustrated in FIG. 20.

The user may usually start a software program for chatting when the terminal 10 is connected to a predetermined network. The terminal 10 may be set to automatically execute the startup of the chatting program with the network. A screen for setting such a startup may be presented on the display 61 in step S164.

Figure 26:
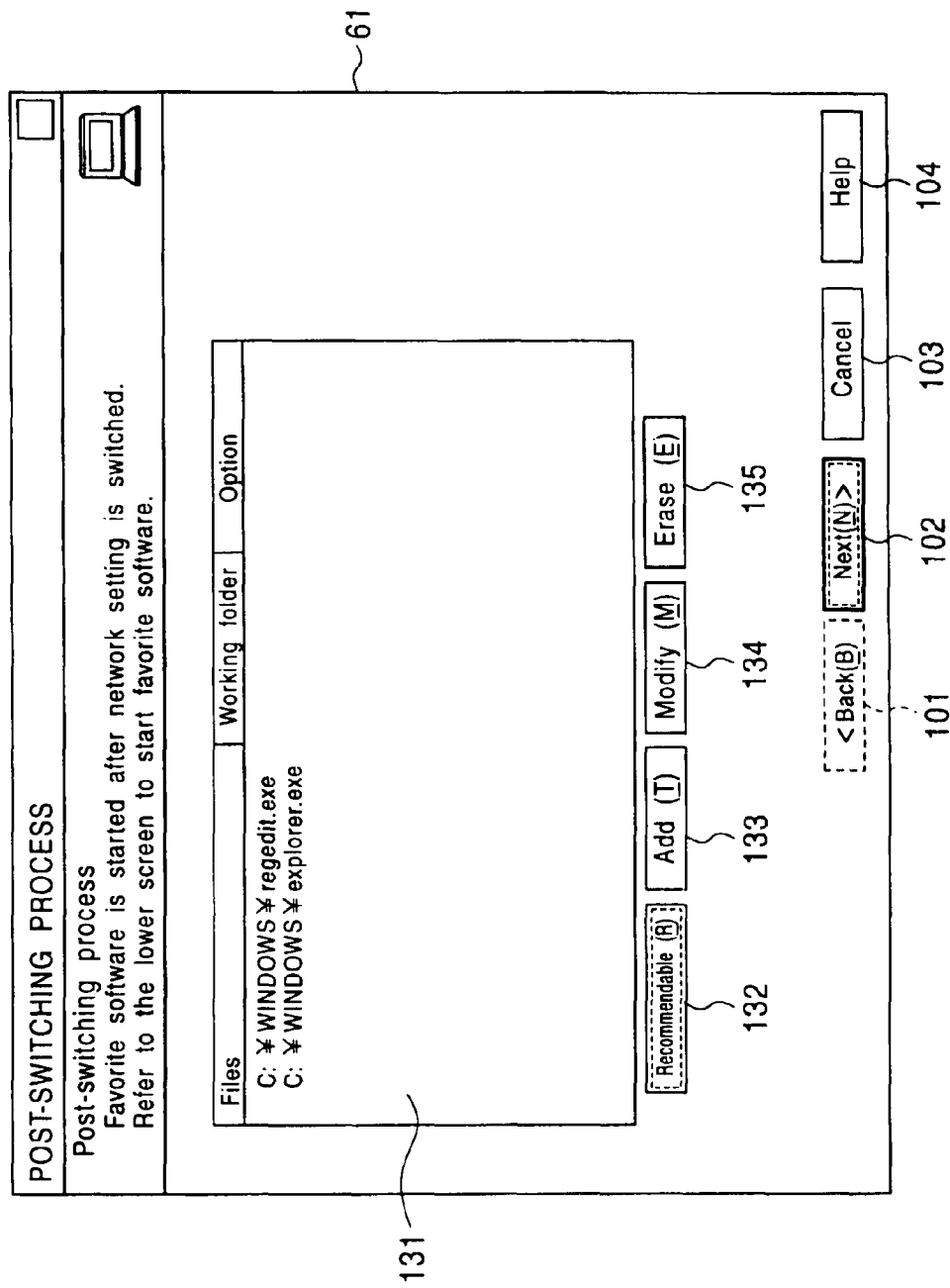
FIG. 26 illustrates an example of the screen presented on the display.

FIG. 26 illustrates an example of the screen which is presented on the display 61 in step S164. As shown, a predetermined software program is registered. When the connection to the network is completed in step S143 (see FIG. 20), the registered software program is started.

A software display section 131 for displaying a registered software program is presented in the screen illustrated in FIG. 26. Presented below the software display section 131 are a recommendable button 132 that is operated to register an already set favorite software program, an add button 133 that is operated to register a new software program, a modify button 134 that is operated to modify the setting relating to the already registered software, and an erase button 135 that is operated to erase an already registered software.

Figure 27:
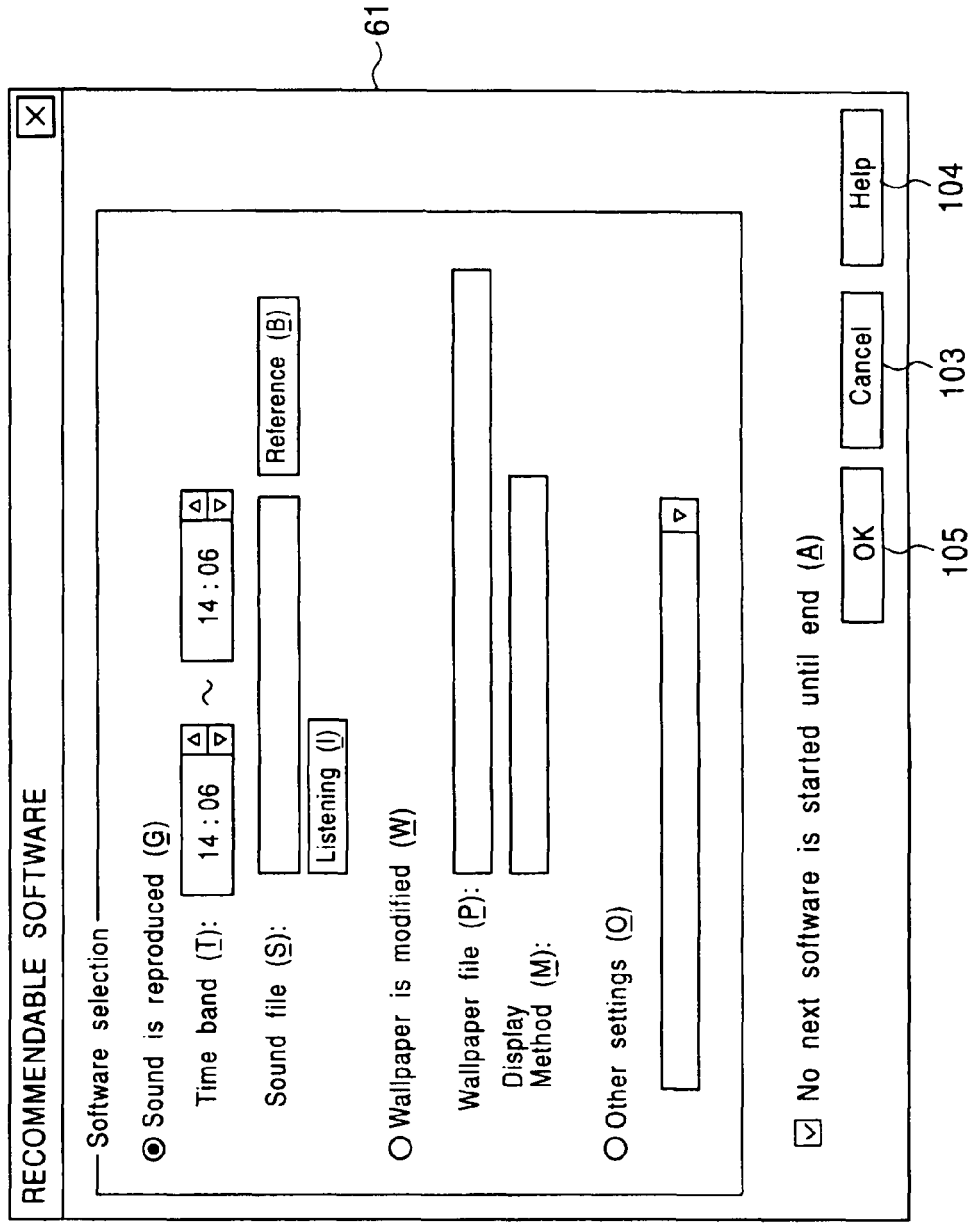
FIG. 27 illustrates an example of the screen presented on the display.

When the recommendable button 132 is operated, a screen shown in FIG. 27 appears on the display 61. Voice and wallpaper are set in the screen illustrated in FIG. 27.

Figure 28:
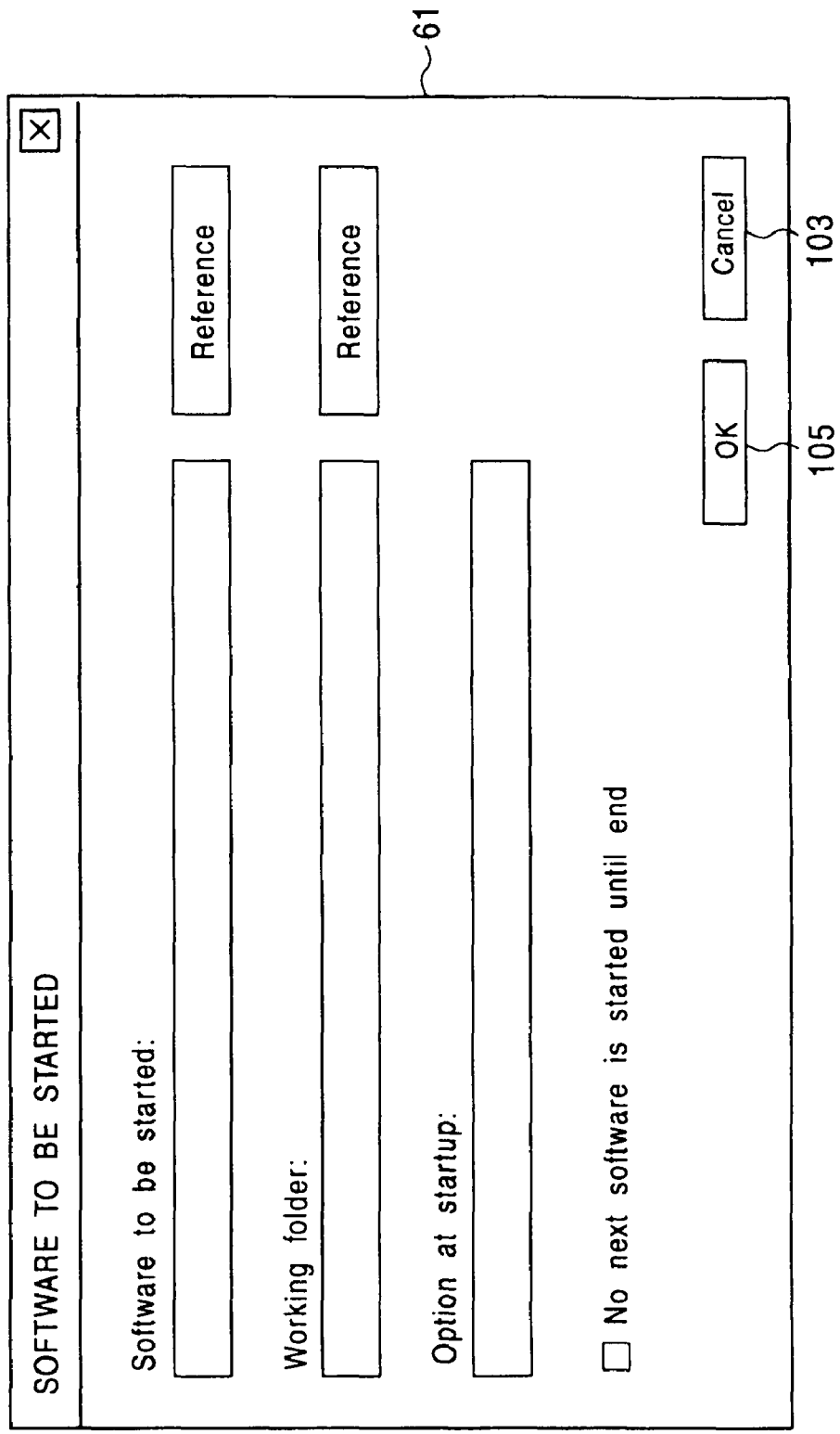
FIG. 28 illustrates an example of the screen presented on the display.

When one of the add button 133 and the modify button 134 is operated, a screen illustrated in FIG. 28 appears on the display 61 as shown in FIG. 28. If the add button 133 is used, each section is blanked as shown in FIG. 28. If the modify button 134 is used, each section presents setting to a software program to which software change is intended.

A <postProcess> block in the profile 53 provides information relating to the setting of the software that is set by operating items on the screen shown in FIG. 26. For example, the information is described in the block 104 of the profile A as shown in FIG. 14. A <path> row describes a path of the software displayed in the software display section 131 on the screen illustrated in FIG. 26.

An option at a command line is described at an <option> row. The information described at the <option/> row is the one described at an option at startup section on the screen shown in FIG. 28. A working directory at the startup is described at a <workDir/> row. The information described at this row is the one described at a working folder section on the screen shown in FIG. 28.

A name of the software is described at a <programName/> row. A <waitProcEnd> row describes information relating to the setting as to whether or not to start a next software program. The information described at this row is "1" when a check button of a comment reading "no next software is started until end" is checked on the screen shown in FIG. 28. The information described at this row is "0" when a check button of a comment reading "no next software is started until end" is not checked on the screen shown in FIG. 28.

An <enable> row describes information indicating whether an entry for the <postProcess> is valid or invalid. These pieces of information are input on a per software program basis. The block 104 shown in FIG. 14 shows that two software programs are set.

Figure 29:
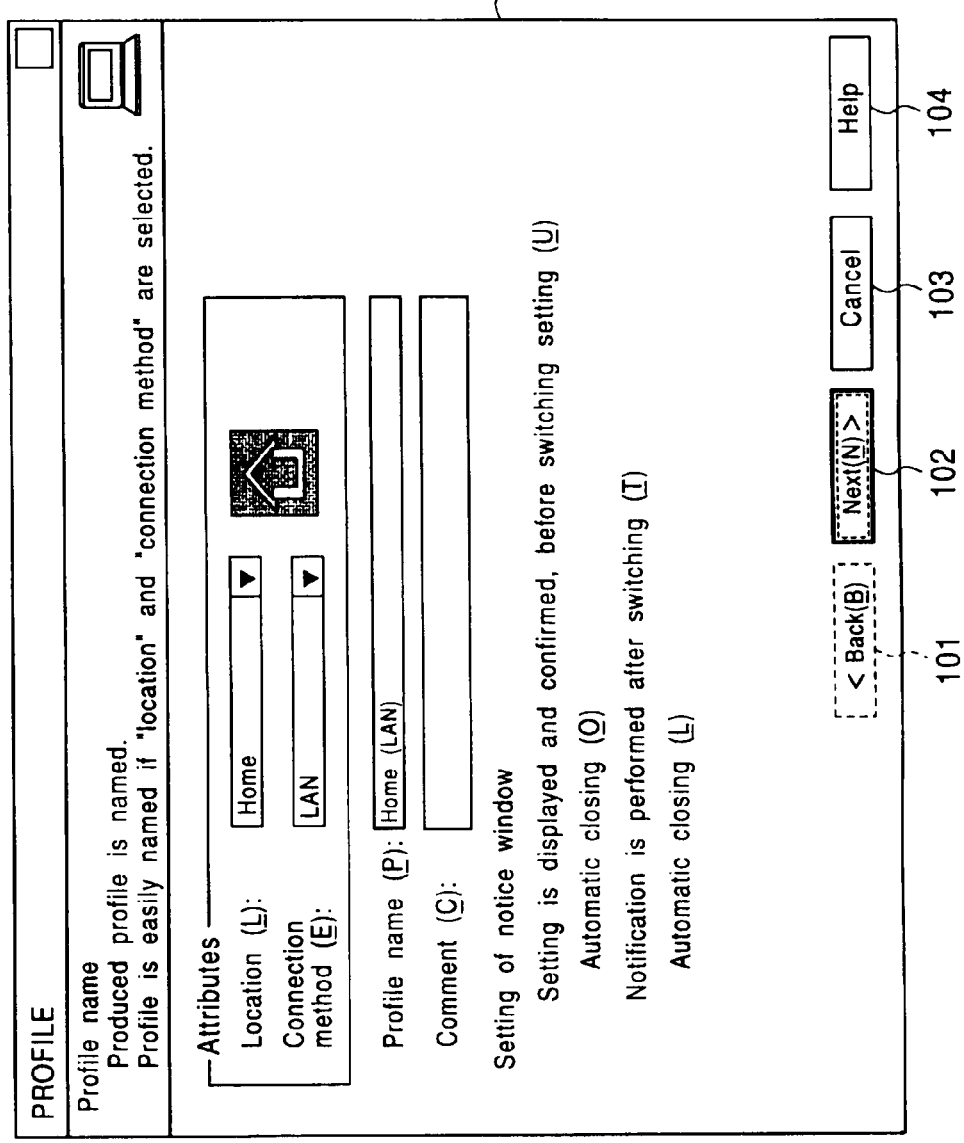
FIG. 29 illustrates an example of the screen presented on the display.

When the next button 102 is operated on the screen shown in FIG. 26, the algorithm proceeds to step S165 (see FIG. 21). A profile setting screen is presented on the display 61. FIG. 29 illustrates an example of the screen that is presented on the display 61 in step S165.

On the screen illustrated in FIG. 29, the produced profiled is named, and a display of a message notifying the user of networks before and after a network switching is set. A location and a connection method, as attributes, are selected. The location and the connection method are selected using a pull-down menu. A desired item may be selected from the pull-down menu.

The profile name is generated based on the location and the connection method selected from the pull-down menu. The user may also input a profile name. In a setting of notice window section, the user makes the setting of whether or not to display a message during a network switching and subsequent to the network switching.

The information set in the screen illustrated in FIG. 29 is described in a <profileInfo> block, namely, the block 103 of the profile A illustrated in FIG. 14, for example. A <profileName> row describes a profile name provided by the user (information displayed at a "profile name" box in FIG. 29).

A <place> row describes a location selected by the user (information selected from the pull-down menu at the "location" box in the attribute section as shown in FIG. 29). A <method> row describes a connection method selected by the user (information selected from the pull-down menu at the "connection method" box in the attribute section shown in FIG. 29). A <description> row describes a comment provided by the user (information written in the comment box shown in FIG. 29).

A <confirmBefore> row sets the value "1" if a check box for a comment reading "Setting is displayed and confirmed before switching" is checked in FIG. 29. A <confirmAutoClose> row sets the value "1" if a check box for a comment reading "Automatic closing" arranged below the comment reading "Setting is displayed and confirmed before switching" is checked.

A <notifyAfter> row sets the value "1" if a check box for a comment reading "Notification is performed after switching" is checked in FIG. 29. A <notifyAutoClose> row sets the value "1" if a comment reading "Automatic closing" arranged below the comment reading "Notification is performed after switching" is checked in FIG. 29.

An <enable> row describes information indicating whether the entry for the <profileInfo> is valid or invalid, and typically sets the value "1" indicating valid information.

Figure 30:
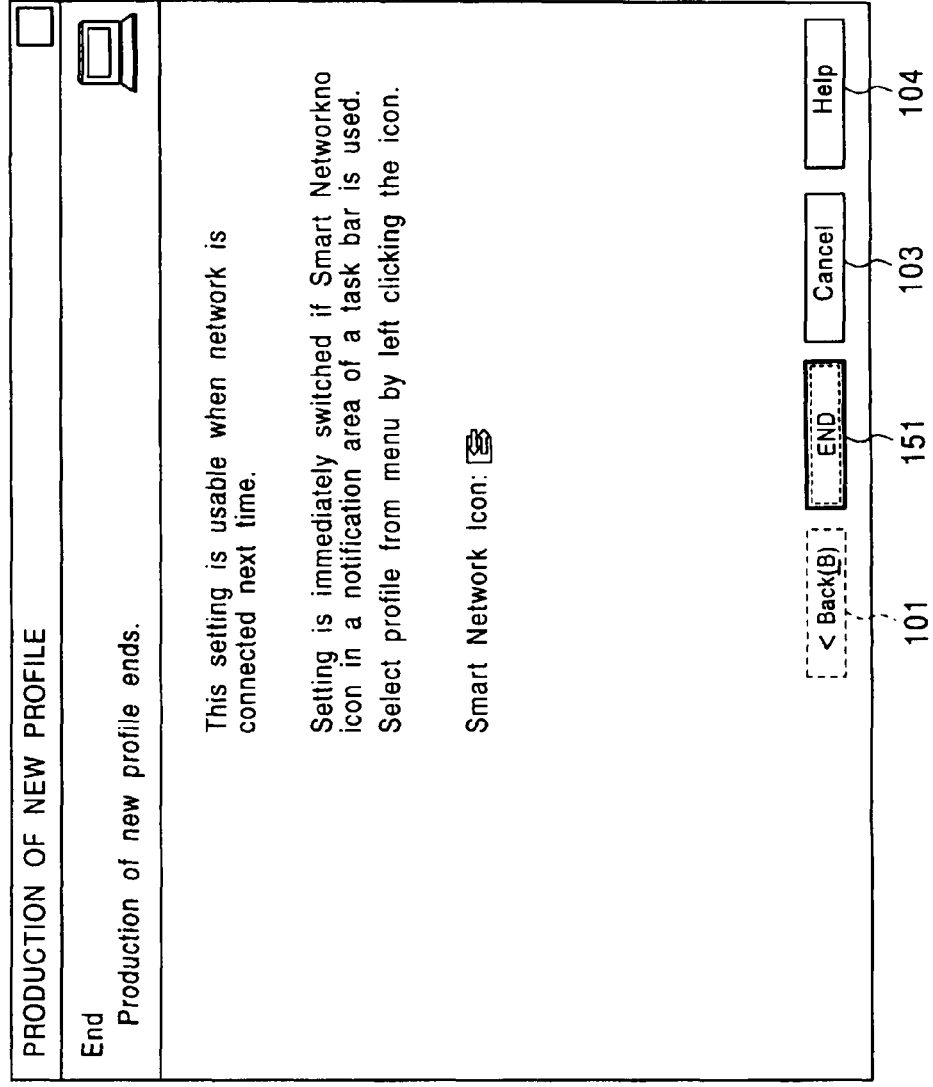
FIG. 30 illustrates an example of the screen presented on the display.

When the next button 102 is operated on the screen illustrated in FIG. 29, the algorithm proceeds to step S166 (see FIG. 21). A screen notifying the user of the end of the production process of the new profile is presented on the display 61. FIG. 30 illustrates an example of the screen which is presented on the display 61 in step S166.

The ending screen illustrated in FIG. 30 allows the user to recognize the end of the production process of the new profile with a text. When the user operates an end button 151 on the screen illustrated in FIG. 30, the production process of the new profile ends.

The profile thus produced is stored in the storage 18 as the profile 53. From the next time on, the network switching process is performed taking into consideration that profile.

The terminal 10 automatically switches from one network to another among a plurality of networks. Without being aware of the network switching process, the user maintains an appropriate network connection. The ease of use of the terminal 10 connected to the plurality of networks is thus assured.

The above series of processes is performed using hardware elements having the functions thereof. Alternatively, the above series of processes may be performed using software. If the processes are performed using software, a program of the software may be installed from a recording medium in a computer built in dedicated hardware or in a general-purpose personal computer that performs a variety of functions with a variety of programs installed therein.

As shown in FIG. 2, the recording medium may be not only a package medium distributed to supply the user with the program, separate from the personal computer (the terminal 10) shown in FIG. 2, such as one of the magnetic disk 31 (including a flexible disk), the optical disk 32 (including CD-ROM (Compact Disk-Read Only Memory), and DVD (Digital Versatile Disk)), the magnetooptical disk 33 (including an MD (Mini-Disk) (tradename)), and the semiconductor memory 34, each storing the program, but also one of the ROM 12 and the storage 18, each storing the program, supplied in the personal computer to the user.

In the specification of the present invention, the steps describing the program stored in the recording medium may be performed sequentially as described in time axis. But the steps are not necessarily sequentially performed in time axis, and may be performed in parallel or separately.

The system in the specification of the present invention refers to the one including a plurality of apparatuses.

In accordance with the embodiments of the present invention, the network switching process is easily performed.

Even when the network switching frequently occurs, an appropriate network connection is maintained with the network connection stability assured.

What is claimed is:

1. An information processing apparatus having a plurality of interfaces for connection with networks, the information processing apparatus comprising:
    managing means for managing settings for the networks as a profile on a network by network basis;
    detecting means for detecting a first connection to the network;
    determination means for determining whether the network is the same network to which has been connected most recently when the detecting means has detected the first connection to the network, specifying which interface out of the plurality of interfaces is connected if the network detected by the detecting means is determined not to be the same with the network to which has been connected, and further determining whether the managing means manages the profile corresponding to the connected network by searching for a profile which is set with a search key corresponding to specified interface by a user; and
    establishing means for establishing a second connection to the network based on the managed profile if the determination means determines that the managing means manages the profile corresponding to the network.

2. An information processing apparatus according to claim 1, wherein the detecting means detects, as the first connection, a connection to a gateway that manages the network, wherein the determination means determines whether the managing means manages the profile relating to the gateway, and wherein the establishing means establishes the second connection to the network in accordance with the profile relating to the gateway.

3. An information processing apparatus according to claim 1, further comprising:
    counter means for counting up by one when the detecting means detects the first connection to the network, and zero determination means that determines whether the subtracting of one from the count of the counter means makes zero when the detecting means detects the first connection to the network, wherein the zero determination means determines whether the managing means manages the profile relating to the network detected by the detecting means when the zero determination means determines that the subtracting of one from the count of the counter means makes zero.

4. An information processing apparatus according to claim 1, wherein, using at least one of an SSID, an MAC address, an IP address, and a connection name the user provides the network with, as a search key, the determination means determines whether the managing means manages the profile relating to the network detected by the detecting means.

5. An information processing apparatus according to claim 1, wherein if the interface is one of a wired LAN interface and a wireless LAN interface, the first connection is a connection to a gateway that manages the network, and the second connection is a connection to another apparatus through the gateway, and wherein if the interface is a modem, the first connection is a connection to an ISP, and the second connection is a connection to another apparatus through the ISP.

6. An information processing apparatus according to claim 1, further comprising starter means which starts a predetermined software set by a user when the second connection to the network is established by the establishing means.

7. An information processing method for an information processing apparatus having a plurality of interfaces for connection with networks, the information processing method comprising:
   managing settings for the networks as profiles on a network by network basis;
   detecting a first connection to the network;
   determining whether the network is the same network to which has been connected most recently when the detecting has detected the first connection to the network, specifying which interface out of the plurality of interfaces is connected if the network detected by the detecting is determined not to be the same with the network to which has been connected, and further determining whether the managing manages the profile corresponding to the detected network by searching for a profile which is set with a search key corresponding to specified interface by a user; and
   establishing a second connection to the network based on the managed profile if the determining determines that the profile corresponding to the network is managed in the managing.

8. A non-transitory computer readable medium encoded with a computer program for a computer for controlling an information processing apparatus having a plurality of interfaces for connection with networks to perform a method comprising:
   managing settings for the networks as profiles on a network by network basis;
   detecting a first connection to the network;
   determining whether the network is the same network to which has been connected most recently when the detecting has detected the first connection to the network, specifying which interface out of the plurality of interfaces is connected if the network detected by the detecting is determined not to be the same with the network to which has been connected, and further determining whether the managing manages the profile corresponding to the detected network by searching for a profile which is set with a search key corresponding to specified interface by a user; and
   establishing a second connection to the network based on the managed profile if the determining determines that the profile corresponding to the network is managed in the managing.

9. An information processing apparatus having a plurality of interfaces for connection with networks, the information processing apparatus comprising:
   managing means for managing various settings at a time of connecting to the networks as profiles on a network by network basis;
   detecting means for detecting a change in the connection with networks;
   determination means for determining whether the network is the same network to which has been connected most recently when the detecting means has detected a change in the connection with networks, specifying which interface out of the plurality of interfaces is connected if the network detected by the detecting means is determined not to be the same with the network to which has been connected, and further determining whether the managing means manages the profile corresponding to the connected network by searching for a profile which is set with a search key corresponding to specified interface by a user; and
   setting means for setting a network parameter based on the profile corresponding to the connected network if the determination means determines that the managing means manages the profile corresponding to the connected network.

10. An information processing apparatus according to claim 9, wherein the detecting means detects a connection to a gateway that manages the network, wherein the determination means determines whether the managing means manages the profile relating to the gateway, and wherein the setting means for setting based on the profile related to the gateway.

11. An information processing apparatus according to claim 9, wherein, using at least one of an SSID, an MAC address, an IP address, and a connection name the user provides the network with, as a search key, the determination means determines whether the managing means manages the profile relating to the network detected by the detecting means.

12. An information processing method for an information processing apparatus having a plurality of interfaces for connection with networks, the information processing method comprising:
   managing various settings at a time of connecting to the networks as profiles on a network by network basis;
   detecting a change in the connection with the network;
   determining whether the network is the same network to which has been connected most recently when the detecting has detected a change in the connection with networks, specifying which interface out of the plurality of interfaces is connected if the network detected by the detecting is determined not to be the same with the network to which has been connected, and further determining whether the managing manages the profile corresponding to the connected network by searching for a profile which is set with a search key corresponding to specified interface by a user; and
   setting a network parameter based on the profile corresponding to the connected network if the determining determines that managing manages the profile corresponding to the connected network.

13. A non-transitory computer readable medium encoded with a computer program for a computer for controlling an information processing apparatus having a plurality of interfaces for connection with networks to perform an information processing method, the information processing method comprising:
   managing various settings at a time of connecting to the networks as profiles on a network by network basis;
   detecting a change in the connection with the network;
   determining whether the network is the same network to which has been connected most recently when the detecting has detected a change in the connection with networks, specifying which interface out of the plurality of interfaces is connected if the network detected by the detecting is determined not to be the same with the network to which has been connected, and further determining whether the managing manages the profile corresponding to the connected network by searching for a profile which is set with a search key corresponding to specified interface by a user; and setting a network parameter based on the profile corresponding to the connected network if the determining determines that managing manages the profile corresponding to the connected network.

* * * * *